US012563454B2

(12) United States Patent
Kim et al.

(10) Patent No.: US 12,563,454 B2
(45) Date of Patent: Feb. 24, 2026

(54) COMMUNICATION RELATED TO UE CONTEXT

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 335 days.

(21) Appl. No.: 18/039,636

(22) PCT Filed: May 2, 2022

(86) PCT No.: PCT/KR2022/006255
§ 371 (c)(1),
(2) Date: May 31, 2023

(87) PCT Pub. No.: WO2022/235034
PCT Pub. Date: Nov. 10, 2022

(65) Prior Publication Data
US 2023/0422105 A1 Dec. 28, 2023

(30) Foreign Application Priority Data

May 3, 2021 (KR) ........................ 10-2021-0057394
Oct. 13, 2021 (KR) ........................ 10-2021-0135991

(51) Int. Cl.
| | |
|---|---|
| *H04W 36/00* | (2009.01) |
| *H04W 36/08* | (2009.01) |
| *H04W 76/27* | (2018.01) |

(52) U.S. Cl.
CPC ..... *H04W 36/0033* (2013.01); *H04W 36/087* (2023.05); *H04W 76/27* (2018.02)

(58) Field of Classification Search
CPC H04W 36/0033; H04W 76/27; H04W 36/087
See application file for complete search history.

(56) References Cited

U.S. PATENT DOCUMENTS

| | | | | |
|---|---|---|---|---|
| 2020/0229258 A1* | 7/2020 | Wang | .................... | H04W 76/12 |
| 2022/0312187 A1* | 9/2022 | Khlass | ................. | H04W 48/20 |
| 2024/0179601 A1* | 5/2024 | Da Silva | .......... | H04W 36/0085 |

FOREIGN PATENT DOCUMENTS

| | | |
|---|---|---|
| KR | 1020190022322 | 3/2019 |
| WO | 2020091533 | 5/2020 |
| WO | 2020194262 | 10/2020 |

OTHER PUBLICATIONS

3GPP TSG-RAN WG3 #111-e R3-210192; 2021 (Year: 2021).*
European Patent Office Application Serial No. 22799077.7, Search Report dated Jan. 30, 2025, 13 pages.

(Continued)

*Primary Examiner* — Chandrahas B Patel
*Assistant Examiner* — Stephen N Steiner
(74) *Attorney, Agent, or Firm* — LEE, HONG, DEGERMAN, KANG & WAIMEY

(57) ABSTRACT

One disclosure of the present specification provides a method for establishing connection by gNB-CU. The method may comprise the steps of: transmitting a request message relating to UE context to the gNB-DU; and receiving a response message from the gNB-DU.

6 Claims, 17 Drawing Sheets

(56)     References Cited

OTHER PUBLICATIONS

ETRI, "Handling of non-SDT data during SDT," 3GPP TSG-RAN #11BBis-e, R2-2103257, Apr. 2021, 2 pages.

Samsung, "Control Plane Aspects of SDT," 3GPP TSG-RAN2 Meeting #112 Electronic, R2-2009095, Oct. 2020, 4 pages.

LG Electronics Inc., "Subsequent data transmission and indication for non-SDT DRBs," 3GPP TSG-RAN2 #113e, R2-2101513, Jan. 2021, 4 pages.

Rapporteur, "Discussion on support of small data transmission in INACTIVE state," 3GPP TSG-RAN WG3 #111-e, R3-210192, Jan. 2021, 15 pages.

3rd Generation Partnership Project (3GPP), "Technical Specification Group Radio Access Network; NG-RAN; F1 application protocol (F1AP) (Release 16)," 3GPP TS 38.473 V16.5.0, Apr. 2021, 465 pages.

PCT International Application No. PCT/KR2022/006255, International Search Report dated Aug. 5, 2022, 3 pages.

* cited by examiner

Figure 3:
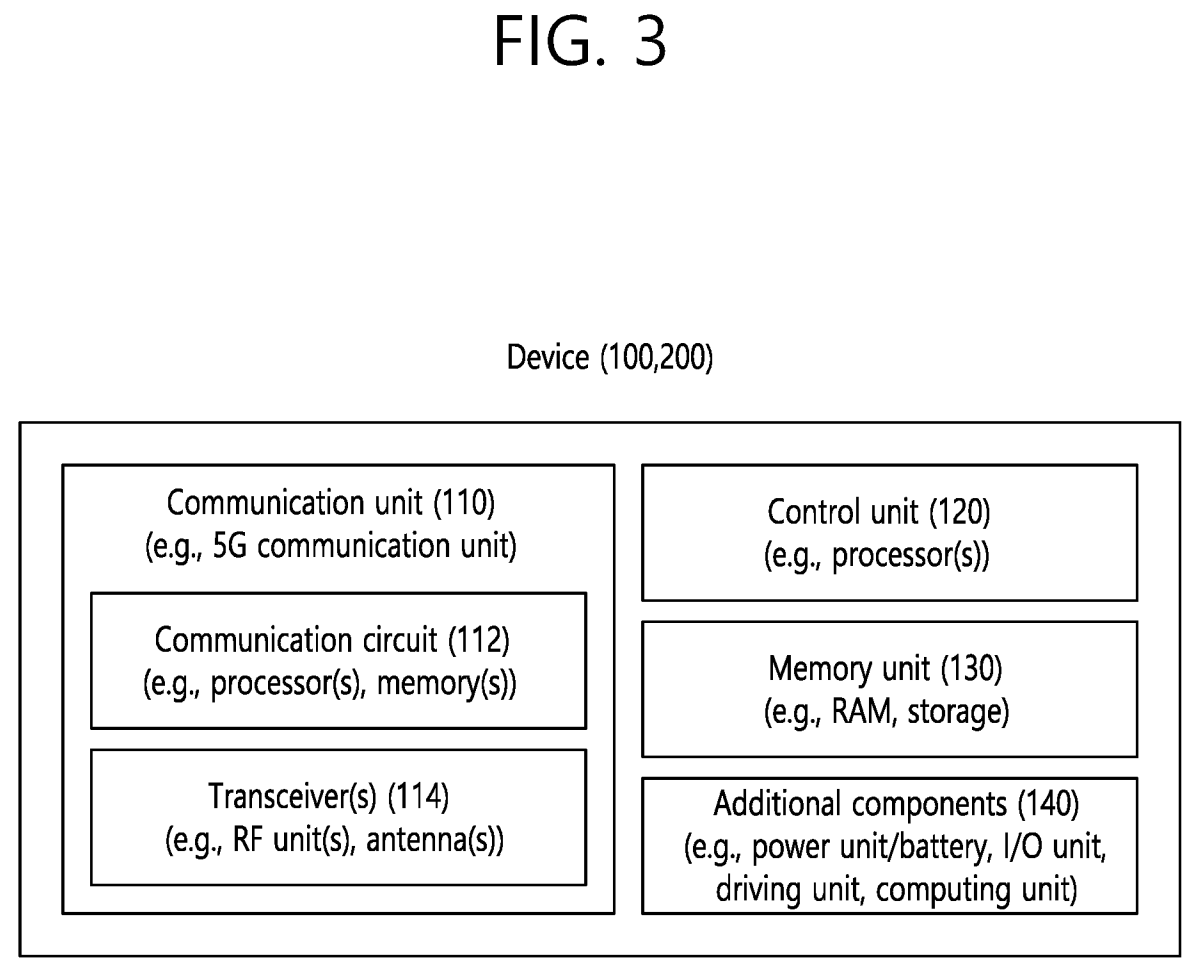

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 9

COMMUNICATION RELATED TO UE CONTEXT

CROSS-REFERENCE TO RELATED APPLICATION(S)

This application is the National Stage filing under 35 U.S.C. 371 of International Application No. PCT/KR2022/006255, filed on May 2, 2022, which claims the benefit of earlier filing date and right of priority to Korean Application Nos. 10-2021-0057394, filed on May 3, 2021, and 10-2021-0135991, filed on Oct. 13, 2021, the contents of which are all incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Small Data Transmission (SDT), which transmits small amounts of data while keeping the terminal in RRC INACTIVE, is being discussed. For example, SDT can be implemented as RACH-based SDT (RA-SDT) or Configured Grant-Small Data Transmission (CG-SDT).

While SDT is in progress, the terminal may have non-SDT bearer data. In this case, the terminal interrupts SDT and starts the process of transitioning to RRC_CONNECTED state in order to pass the non-SDT bearer data to the network. If the NG-RAN is separated into gNB-DU and gNB-CU, the gNB-DU allocates resources and UE context for one terminal once again, even if the terminal already has resources and UE context allocated for SDT (e.g., RA-SDT or CG-SDT). For example, the gNB-DU does not know that a terminal has started the process of transitioning to the RRC_CONNECTED state during SDT (e.g., RA-SDT or CG-SDT) without additional information, so it allocates an additional resource and UE context for that terminal. This may result in resource waste due to duplicate resource and UE context allocation.

SUMMARY

Accordingly, a disclosure of the present specification has been made in an effort to solve the aforementioned problem.

In order to solve the above problems, one disclosure of the present specification provides a method for a gNB-CU to perform communication. The method may include: transmitting a request message related to a UE context to a gNB-DU; and receiving a response message from the gNB-DU.

In order to solve the above problems, one disclosure of the present specification provides a gNB-CU for performing communications. The gNB-CU comprising: at least one processor; and at least one memory storing instructions, operatively electrically coupled to the at least one processor, wherein the instructions being executed by the at least one processor for performing operations comprising: transmitting a request message related to the UE context to the gNB-DU; and receiving a response message from the gNB-DU.

In order to solve the above problems, one disclosure of the present specification provides a method for a gNB-DU to perform communication. The method may include: receiving a request message from a gNB-CU related to a UE context; and receiving a response message from the gNB-CU.

In order to solve the above problems, one disclosure of the present specification provides a gNB-DU for performing communications. The gNB-DU comprises: at least one processor; and at least one memory storing instructions, operatively electrically coupled to the at least one processor, wherein the instructions being executed by the at least one processor perform operations comprising: receiving a request message from the gNB-CU related to the UE context; and receiving a response message from the gNB-CU.

According to the disclosure of the present specification, it is possible to solve the problems of the related art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 1 shows an example of a communication system to which implementations of the present disclosure is applied.

FIG. 2 shows an example of a wireless device to which implementations of the present disclosure is applied.

FIG. 3 shows an example of a wireless device to which implementations of the present disclosure is applied.

3

Figure 7:
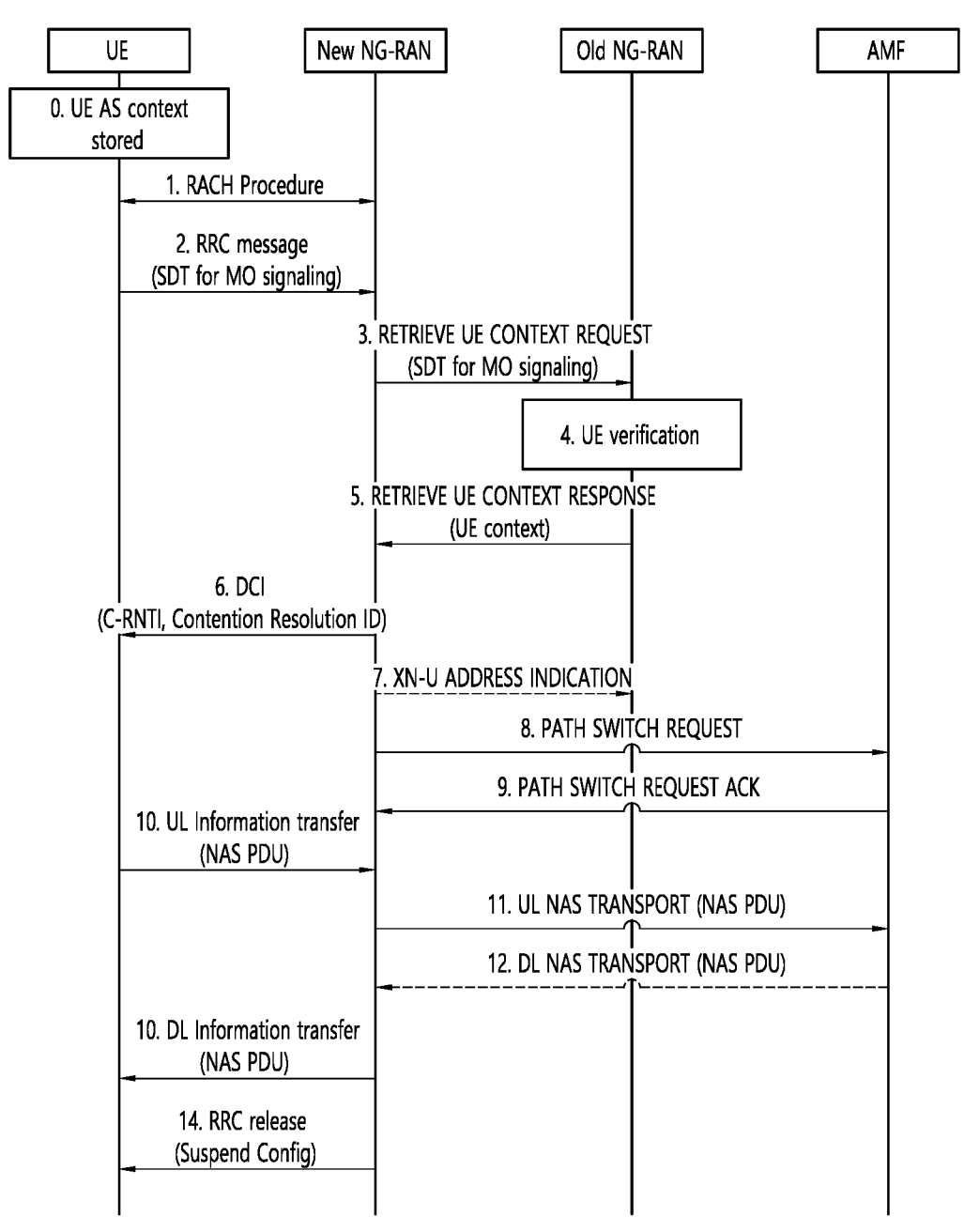

FIG. 7 illustrates a signal flow diagram according to a first example of the first embodiment of the disclosure of the present specification.

Figure 8A:
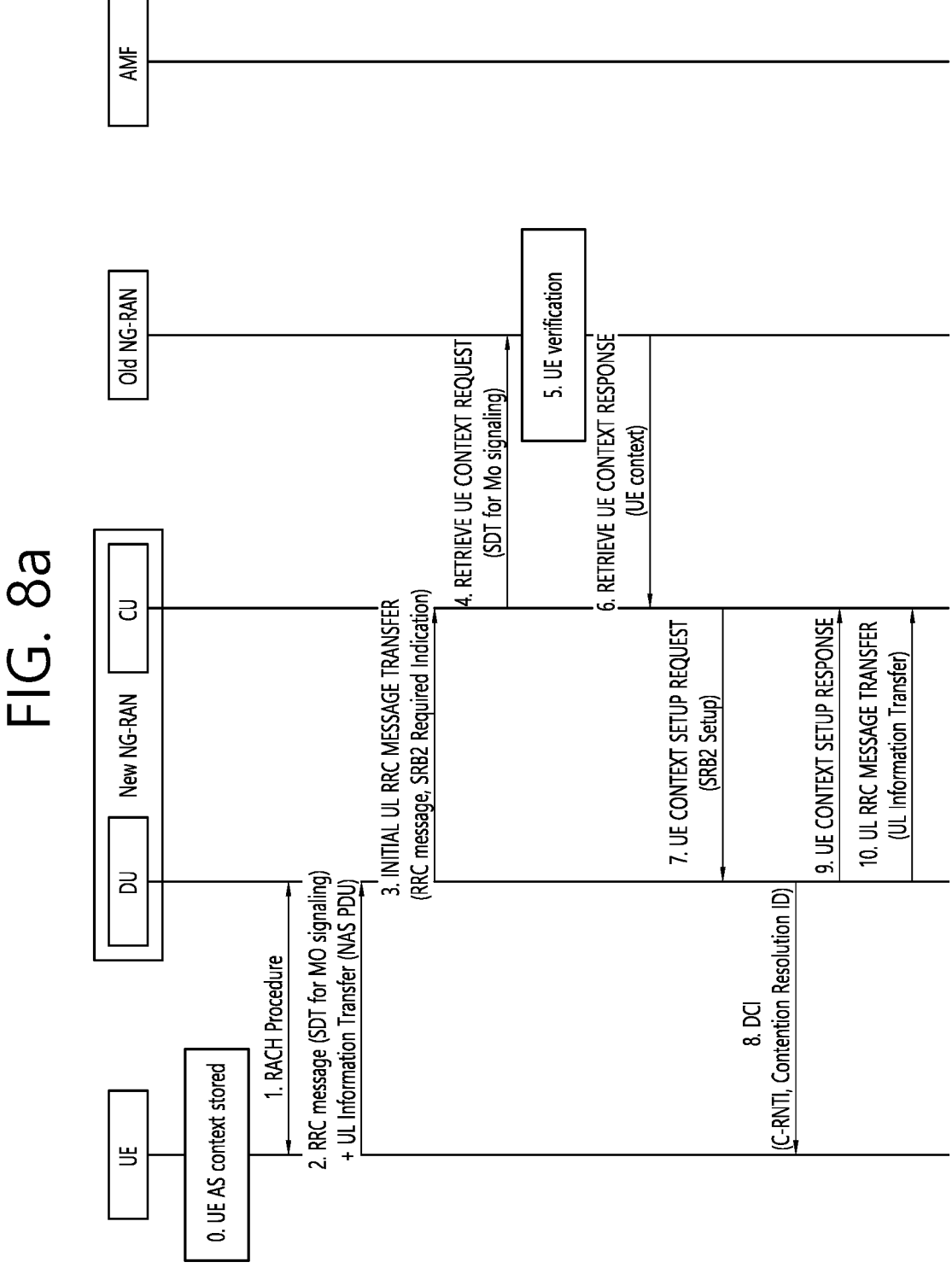
Figure 8B:
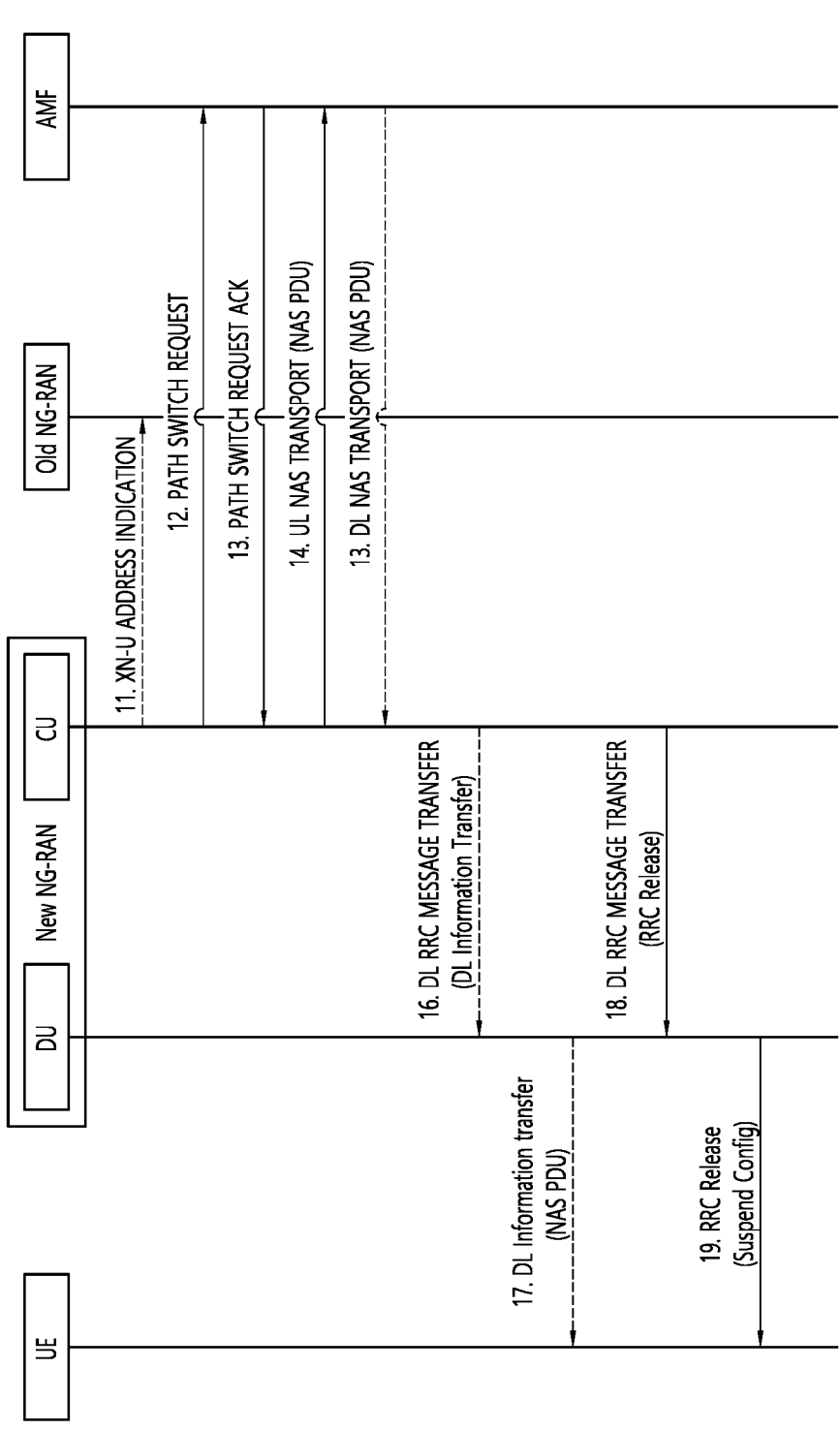

FIGS. 8a and 8b illustrate signal flow diagrams according to a second example of the first example of the disclosure of the present specification.

Figure 9:
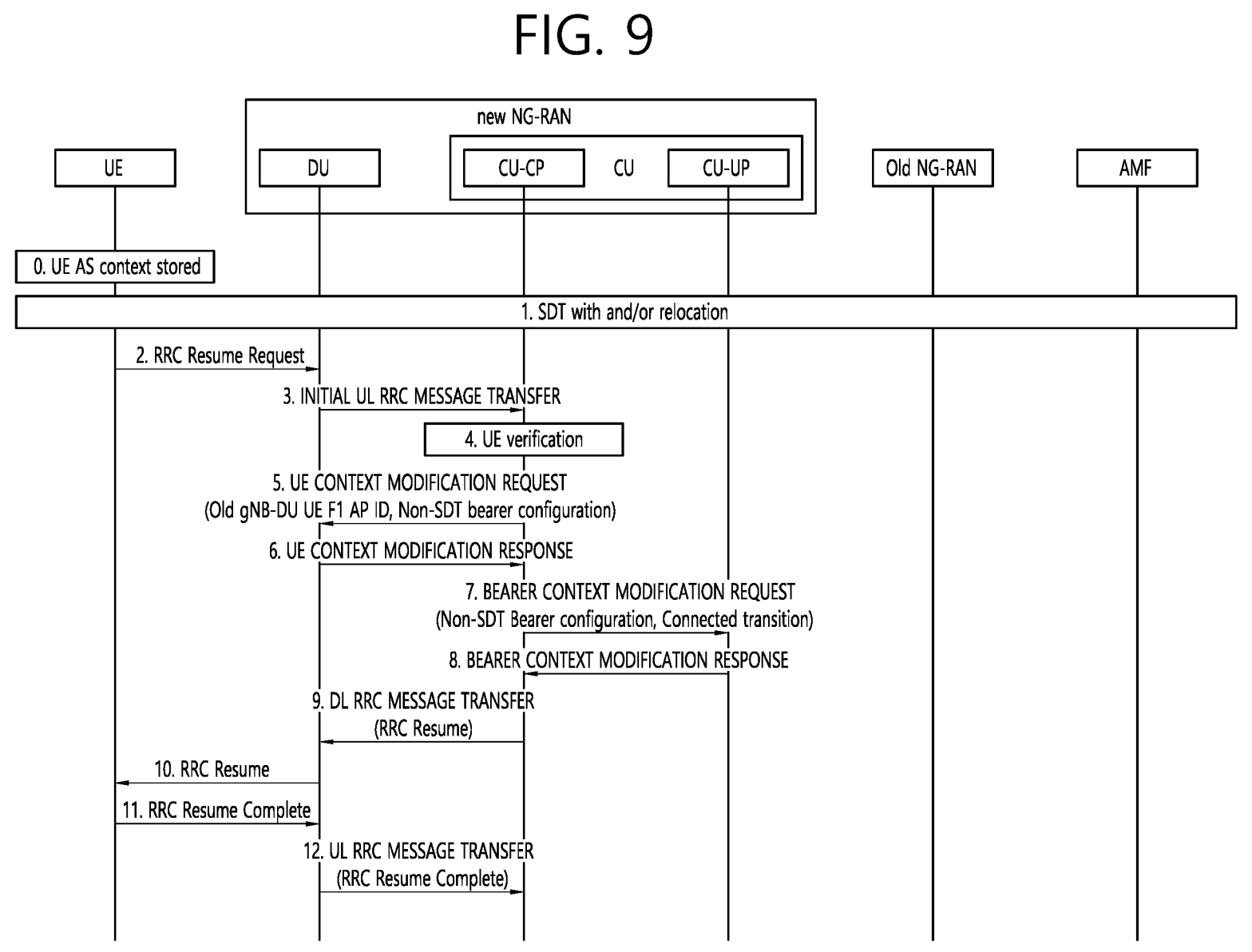

FIG. 9 illustrates a signal flow diagram according to the first example of the second example of the disclosure of the present specification.

Figure 10A:
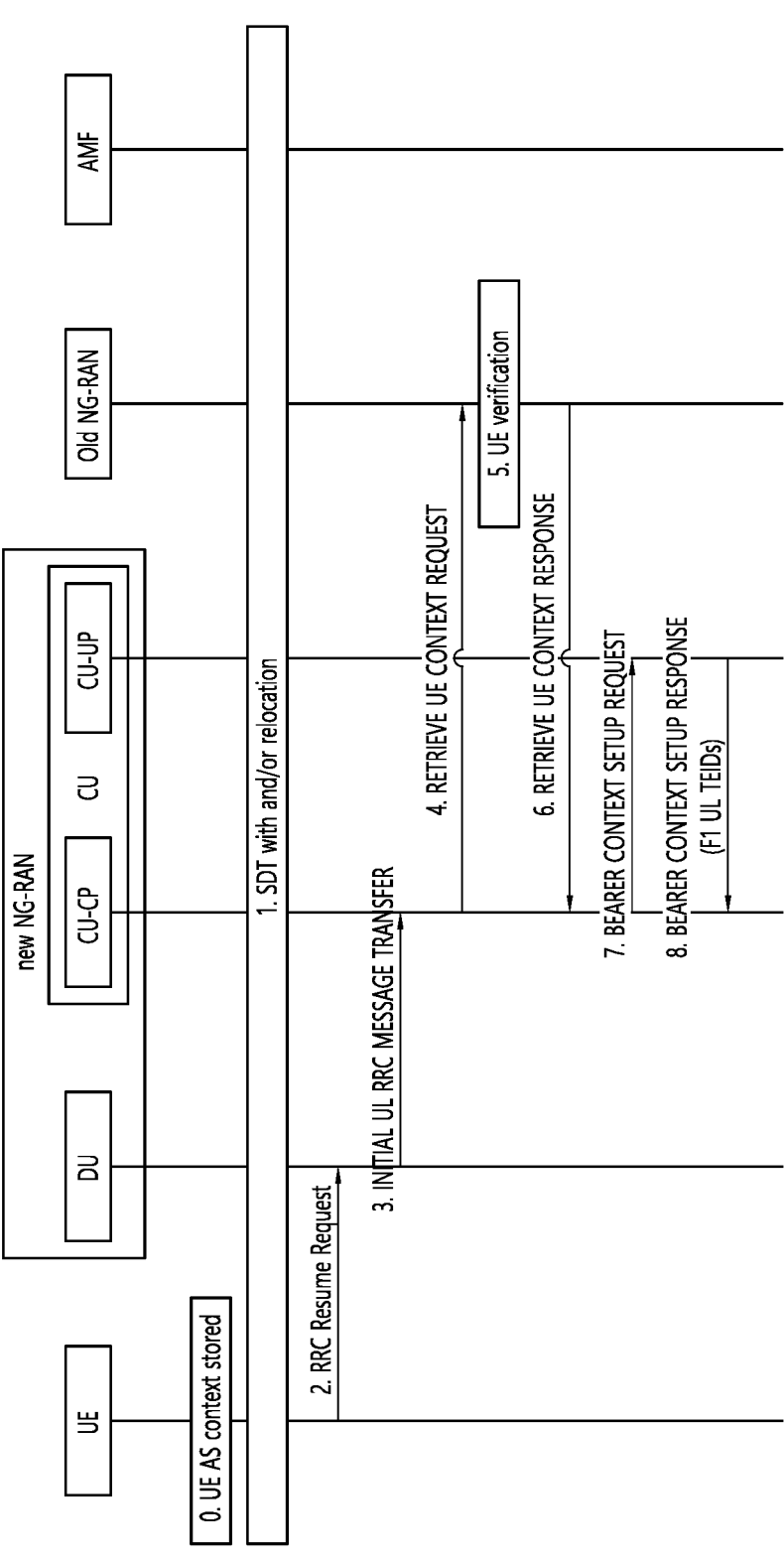
Figure 10B:
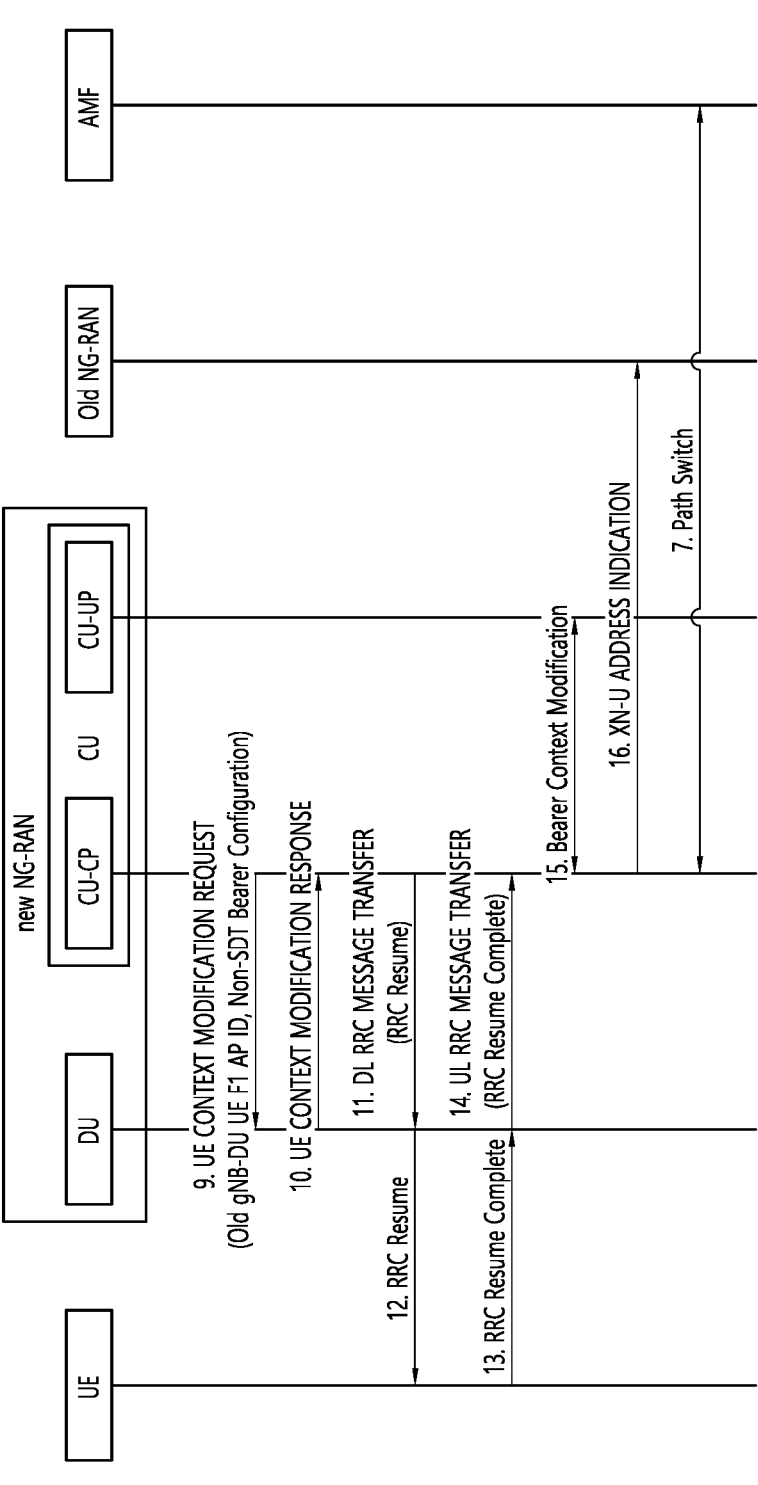

FIGS. 10a and 10b illustrate signal flow diagrams according to the second example of the second example of the disclosure of the present specification.

Figure 11:
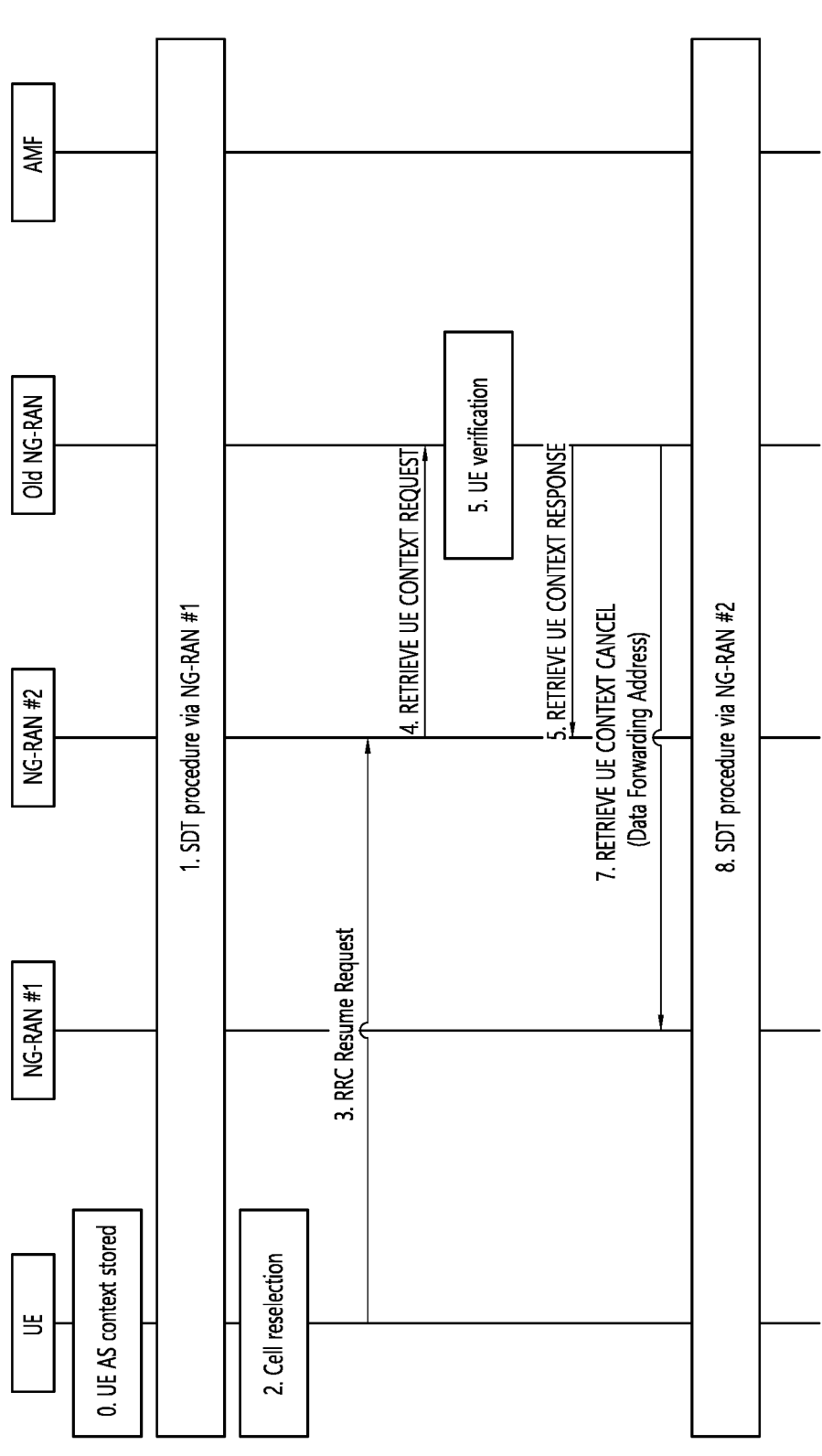

FIG. 11 illustrates a signal flow diagram according to the first example of the second example of the disclosure of the present specification.

Figure 12:
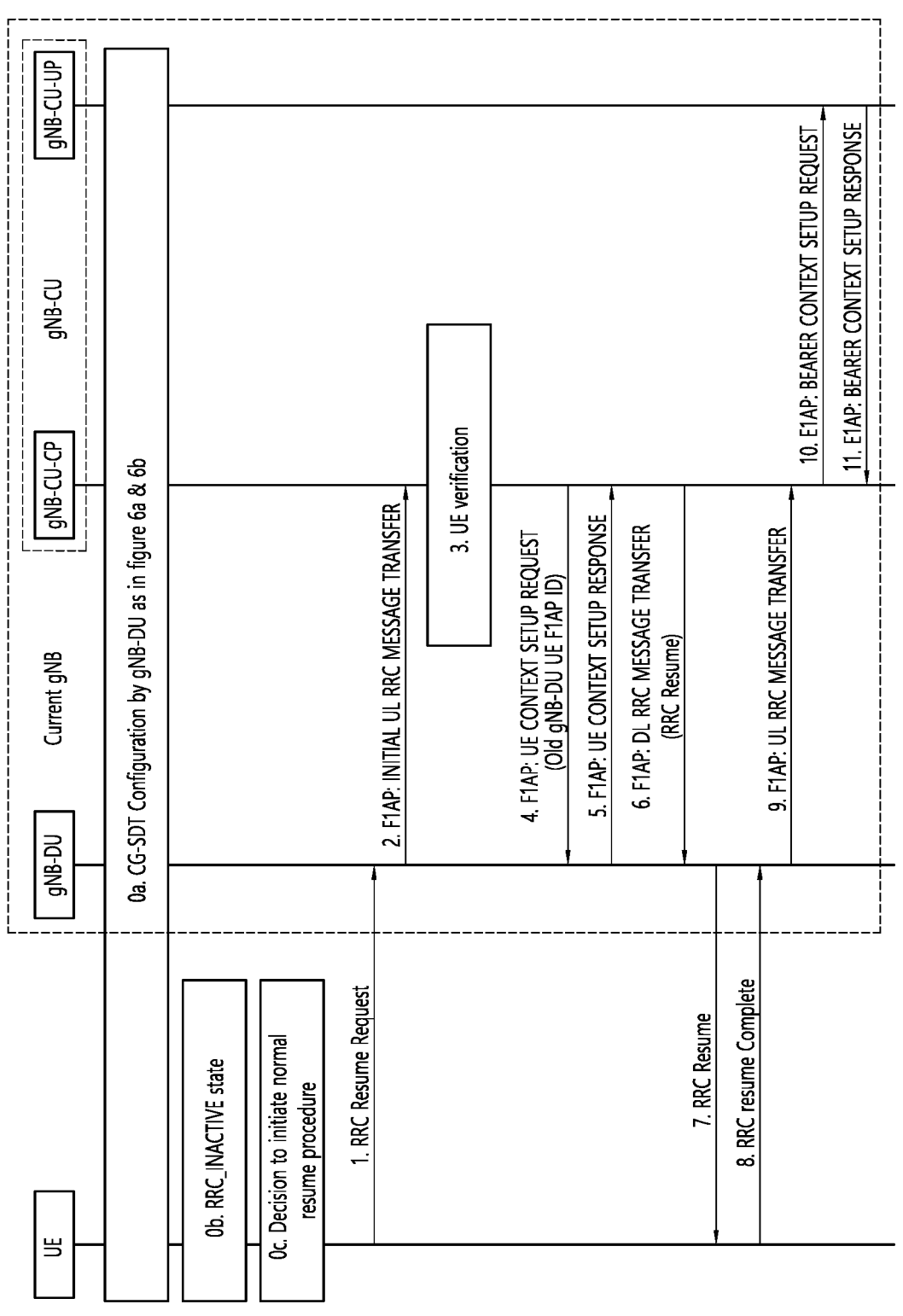

FIG. 12 illustrates a signal flow diagram according to the fourth example of the disclosure of the present specification.

Figure 13:
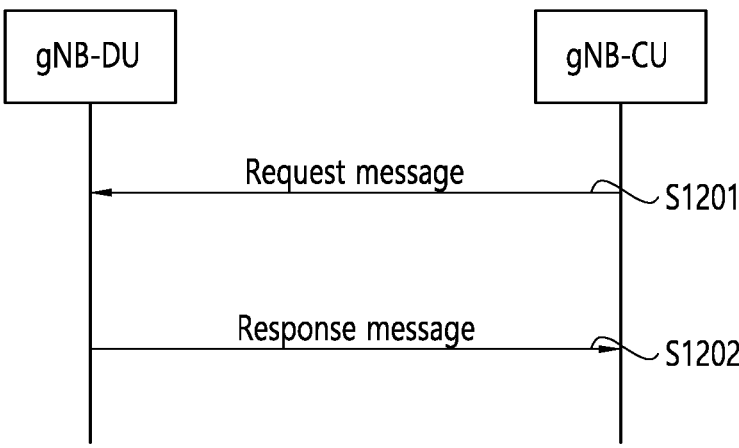

FIG. 13 is a signal flow diagram according to the first example of the fifth example of the disclosure of the present specification.

Figure 14:
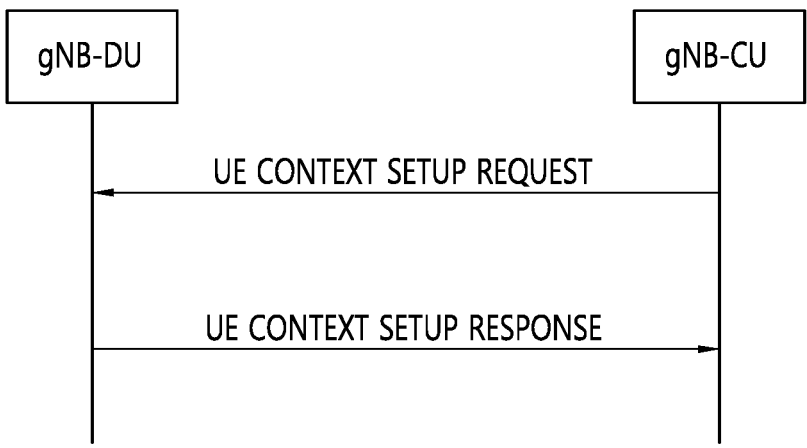

FIG. 14 illustrates a signal flow diagram according to second example of the fifth example of the disclosure of the present specification.

DETAILED DESCRIPTION

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

I. Techniques and Procedures Applicable to the Disclosure of the Present Specification FIG. 1 shows an example of a communication system to which implementations of the present disclosure is applied.

Figure 1:
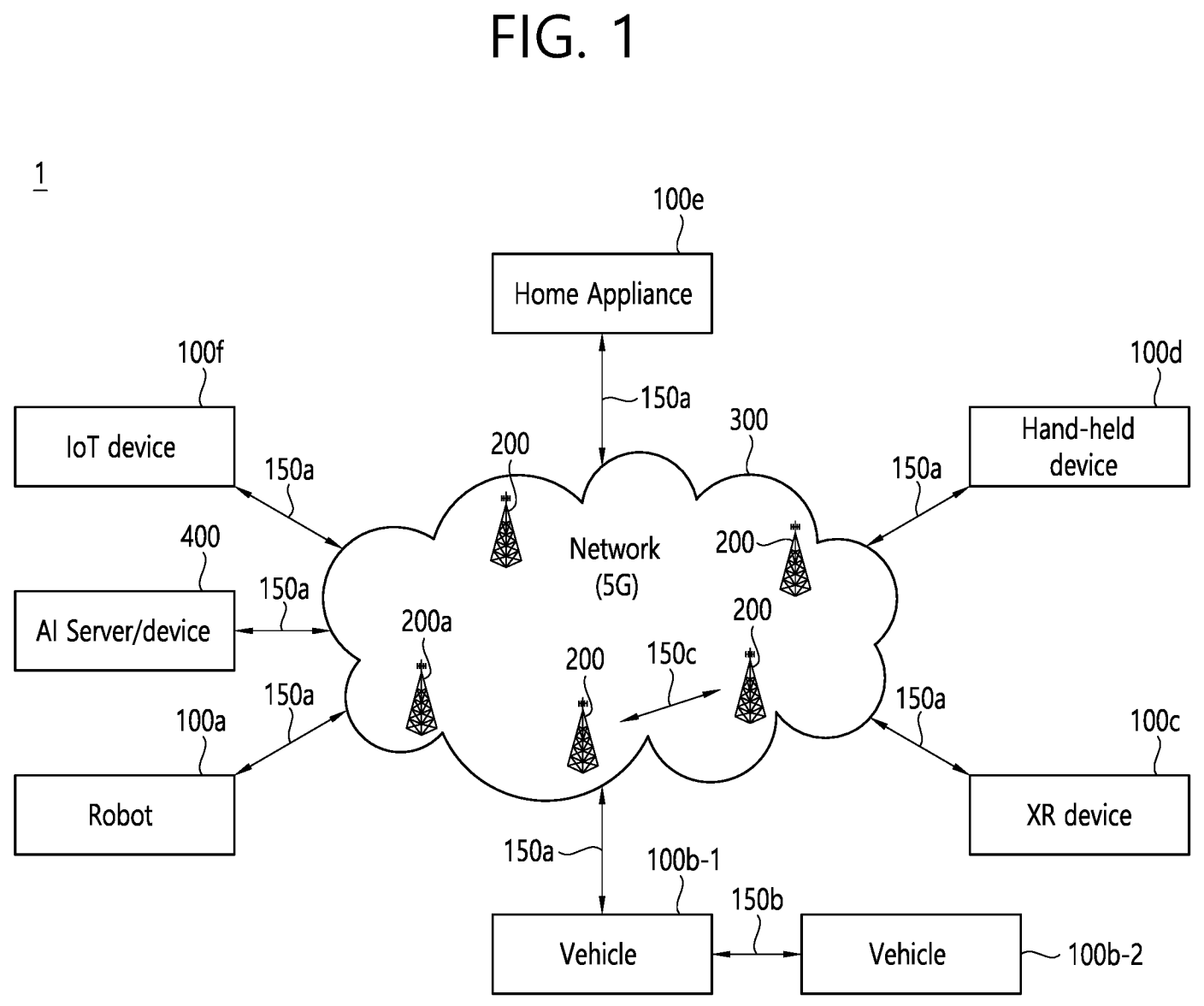

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration.

For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally, and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally, and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
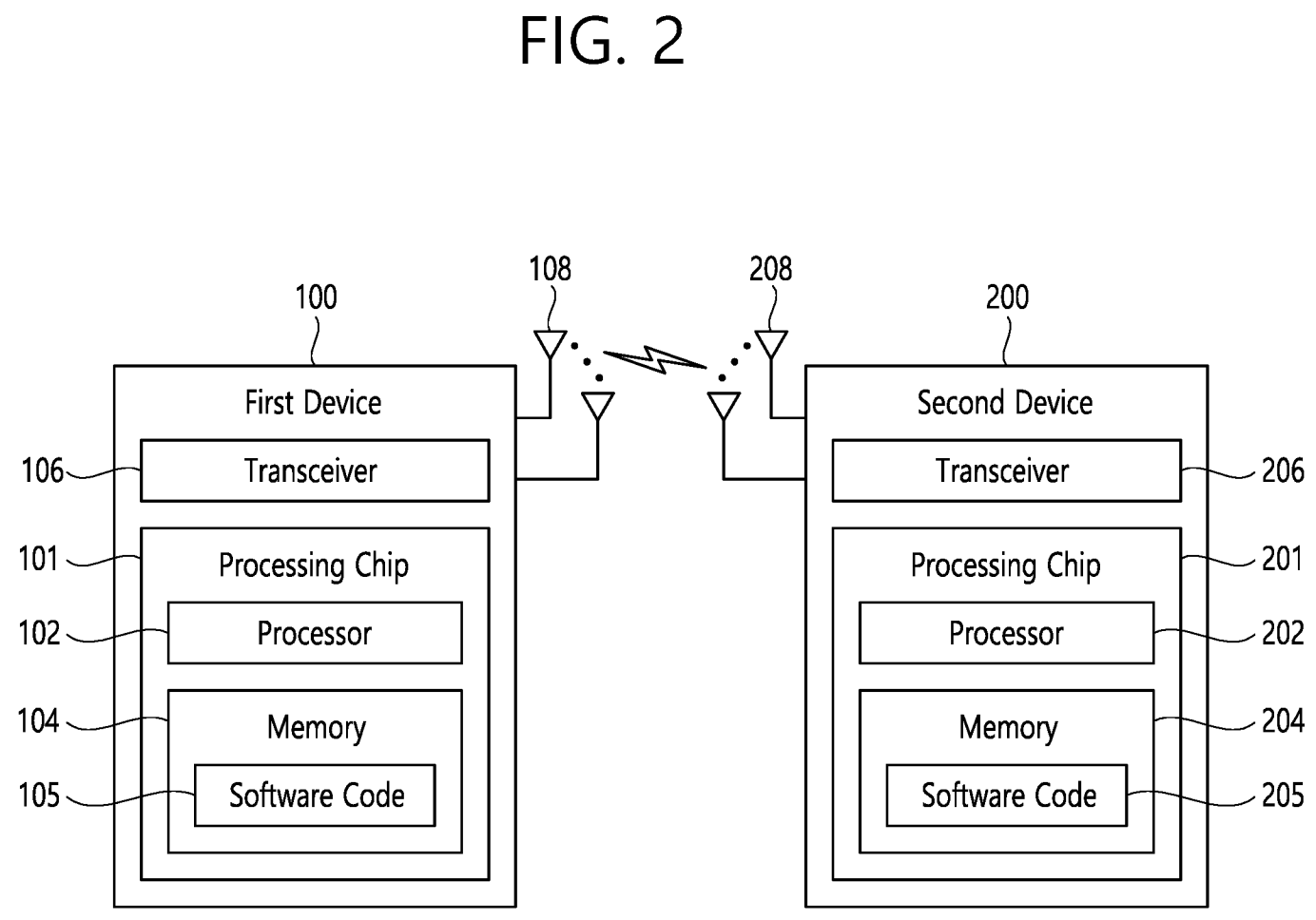

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals)

from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
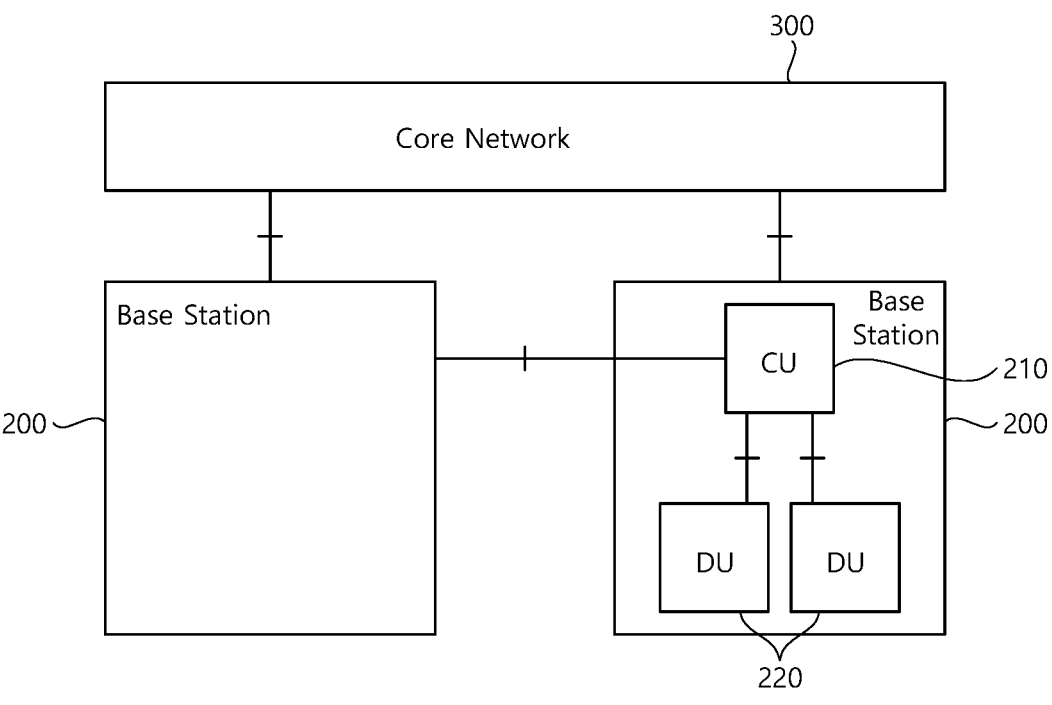
FIG. 4 shows an example of a network node to which implementations of the present disclosure is applied.

FIG. 4 shows an example of a network node to which implementations of the present disclosure is applied.

FIG. 4 is a diagram illustrating the second wireless device 200 of FIG. 2 or the wireless device 200 of FIG. 3 described above in more detail, when the base station is divided into a central unit (CU) and a distributed unit (DU).

Referring to FIG. 4, base station 200 may be connected to core network 300. Base stations 200 may be connected to each other. For example, an interface between the base station 200 and the core network 300 may be referred to as NG. For example, an interface between base stations 200 may be referred to as Xn.

Base station 200 may be divided into CU 210 and DU 220. That is, base station 200 may be hierarchically separated and operated. CU 210 may be connected to one or more DUs 220. For example, an interface between the CU 210 and the DU 220 may be referred to as F1. The CU 210 may perform a function of upper layers of the base station 200, and the DU 220 may perform a function of lower layers of the base station 200. For example, the CU 210 may be a logical node hosting RRC, SDAP, and PDCP layers of the base station 200 (e.g., gNB). Alternatively, the CU (W32) may be a logical node hosting the RRC and PDCP layers of the base station 200 (e.g., ng-eNB). For example, DU 220 may be a logical node hosting the RLC, MAC and PHY layers of the base station.

The operation of DU 220 may be partially controlled by CU 210. One DU 220 may support one or more cells. One cell may be supported by only one DU 220. One DU 220 may be connected to one CU 210, and one DU 220 may be connected to a plurality of CUs 210 according to appropriate implementation.

Figure 5:
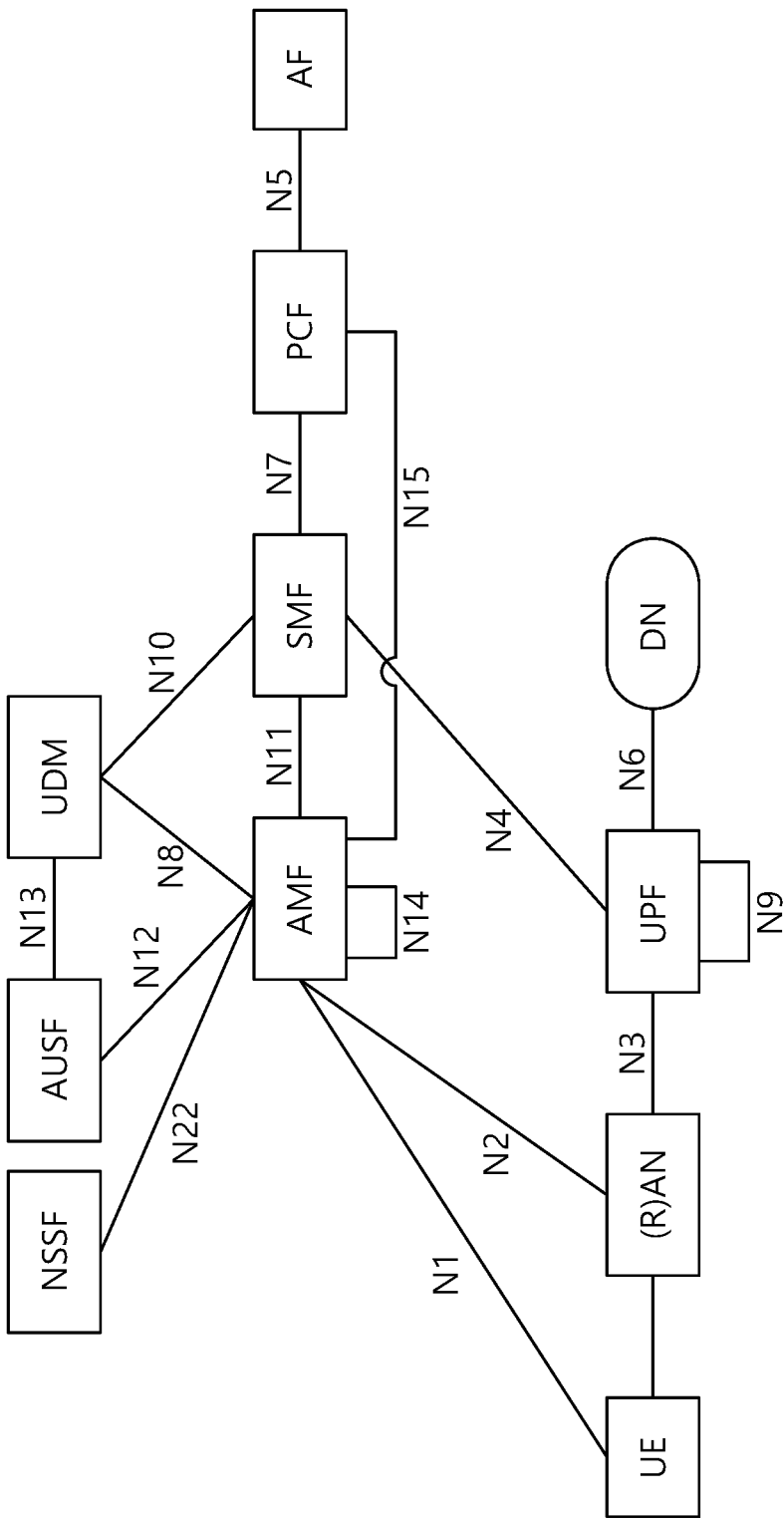
FIG. 5 shows an example of 5G system architecture to which implementations of the present disclosure is applied.

FIG. 5 shows an example of 5G system architecture to which implementations of the present disclosure is applied.

The 5G system (5GS) architecture consists of the following network functions (NF).

Authentication Server Function (AUSF)

Access and Mobility Management Function (AMF)

Data Network (DN), e.g., operator services, Internet access or 3rd party services Unstructured Data Storage Function (UDSF)

Network Exposure Function (NEF)

Intermediate NEF (I-NEF)

Network Repository Function (NRF)

Network Slice Selection Function (NSSF)

Policy Control Function (PCF)

Session Management Function (SMF)

Unified Data Management (UDM)

Unified Data Repository (UDR)

User Plane Function (UPF)

UE radio Capability Management Function (UCMF)

Application Function (AF)

User Equipment (UE)

(Radio) Access Network ((R)AN)

5G-Equipment Identity Register (5G-EIR)

Network Data Analytics Function (NWDAF)

CHarging Function (CHF)

Furthermore, the following network functions may be considered.

Non-3GPP InterWorking Function (N3IWF)

Trusted Non-3GPP Gateway Function (TNGF)

Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 5. For clarity, the NWDAF and its connections with other NFs, e.g., PCF, are not depicted in FIG. 5.

The 5G system architecture contains the following reference points:

N1: Reference point between the UE and the AMF.

N2: Reference point between the (R)AN and the AMF.

N3: Reference point between the (R)AN and the UPF.

N4: Reference point between the SMF and the UPF.

N6: Reference point between the UPF and a Data Network.

N9: Reference point between two UPFs.

The following reference points show the interactions that exist between the NF services in the NFs.

N5: Reference point between the PCF and an AF.

N7: Reference point between the SMF and the PCF.

N8: Reference point between the UDM and the AMF.

N10: Reference point between the UDM and the SMF.

N11: Reference point between the AMF and the SMF.

N12: Reference point between the AMF and the AUSF.

N13: Reference point between the UDM and the AUSF.

N14: Reference point between two AMFs.

N15: represents a reference point between PCF and AMF, and a reference point between AMF and PCF of a visited network in a roaming scenario.

N16: Reference point between two SMFs, (in roaming case between SMF in the visited network and the SMF in the home network).

N22: Reference point between the AMF and the NSSF.

N30: Reference point between PCF and NEF.

N33: Reference point between AF and NEF.

In some cases, a couple of NFs may need to be associated with each other to serve a UE.

For reference, in FIG. 5, an AF by a third party other than an operator may be connected to 5GC through NEF.

<Connection Management (CM)>

The CM is used to establish or release a signaling connection between the UE and the AMF. For example, the CM includes the function of establishing and releasing the NAS signaling connection between the UE and the AMF through the N1 reference point. The NAS signaling connection enables NAS signaling exchange between the UE and the core network.

NAS signaling connection may include AN signaling connection (RRC connection over 3GPP access or connection between UE and N3IWF over non-3GPP access) between AN (Access Network) and UE and N2 connection for UE between AN and AMF.

The two CM states are used to reflect the NAS signaling connection between the UE and the AMF. The two CM states are:

CM-IDLE

CM-CONNECTED

The CM status for 3GPP access and the CM status for non-3GPP access may be independent of each other. For example, the UE may be in a CM-IDLE state for 3GPP access and a CM-CONNECTED state for non-3GPP access.

Hereinafter, the CM-IDLE state, the CM-CONNECTED state, and the transition between the CM-IDLE state and the CM-CONNECTED state will be described.

1. CM-IDLE State

The UE in the CM-IDLE state does not have a NAS signaling connection with the AMF through the N1 interface. The UE may perform a cell selection or cell reselection procedure and a PLMN selection procedure.

For a UE in CM-IDLE state, there are no AN signaling connections, N2 connections and N3 connections. When the UE is in the CM-IDLE state and the RM (Registration Management)-REGISTERED state, the UE may perform the following operations:

As long as the UE is not in Mobile Initiated Connection Only (MICO) mode, the UE may respond to paging by performing a service request procedure.

When the UE has uplink signaling or user data to transmit, it may perform a service request procedure.

If the UE state in the AMF is RM-REGISTERED, UE information for initiating communication with the UE may be stored in the AMF. The AMF may use 5G-GUTI (Globally Unique Temporary Identifier) to retrieve stored information required to initiate communication with the UE.

The UE may provide 5G-Short-Temporary Mobile Subscriber Identity (5G-S-TMSI) as a part of AN parameters while performing a procedure for AN signaling connection establishment. Whenever an AN signaling connection is established between the UE and the AN (when entering the RRC Connected state through 3GPP access, or when establishing a connection between the UE and N3IWF through non-3GPP access), the UE may enter the CM-CONNECTED state.

Transmission of the Initial NAS message initiates the transition from the CM-IDLE state to the CM-CONNECTED state. Here, the initial NAS message may be, for example, a registration request message, a service request message, or a deregistration request message.

If the UE state in the AMF is CM-IDLE and RM-REGISTERED, the AMF may perform the following operation:

When the AMF has mobile-terminated data or signaling to be transmitted to the UE, the AMF may perform a network triggered Service Request procedure by transmitting a paging request message to the UE. AMF may perform the network initiation service request procedure, except when the UE cannot respond due to MICO mode or mobility restrictions.

Whenever an N2 connection is established between the AN and the AMF for the UE, the AMF may enter the CM-CONNECTED state for the UE. Reception of the initial N2 message (eg, N2 INITIAL UE MESSAGE) initiates the transition from the CM-IDLE state to the CM-CONNECTED state in the AMF.

When the UE and the AMF are in the CM-IDLE state, for example, by activating the MICO mode, power efficiency and signaling efficiency may be optimized.

2. CM-CONNECTED State

The UE in the CM-CONNECTED state has a signaling connection with the AMF through the N1 reference point. NAS signaling connection may use RRC connection between UE and NG-RAN and New Generation Application Protocol (NGAP) UE association between AN and AMF for 3GPP (NGAP UE association). The UE may be in a CM-CONNECTED state with an NGAP UE association that is not bound to any TNLA (Transport Network Layer Association) between the AN and the AMF. When the NAS signaling procedure is completed, the AMF may decide to release the NAS signaling connection with the UE.

In the CM-CONNECTED state, the UE may perform the following operations:

whenever the AN signaling connection is released (for example, when entering RRC Idle state via 3GPP access, or when it is detected by the UE that the connection between the UE and N3IWF via non-3GPP access is disconnected), the UE may enter the CM-IDLE state.

When the UE CM state in the AMF is the CM-CONNECTED state, the AMF may perform the following operations:

When the AN release procedure is completed, if the logical NGAP signaling connection for the UE and the N3 user plane connection are released, the AMF may enter the CM-IDLE state for the UE.

Until the UE is de-registered from the core network, the AMF may maintain the UE CM state in the AMF in the CM-CONNECTED state.

The UE in the CM-CONNECTED state may be in the RRC deactivation state. If the UE is in RRC deactivation state, the following applies:

UE reachability is managed by the RAN, along with assistance information from the core network, UE paging is managed by the RAN.

The UE manages paging using the UE's CN (5G-S-TMSI) and RAN identifier

3. Transition Between CM-IDLE State and CM-CONNECTED State

Based on the above description of the CM-IDLE state and the description of the CM-CONNECTED state, an example of transition between the CM-IDLE state and the CM-CONNECTED state will be described.

When the CM state in the UE is the CM-IDLE state, when the AN signaling connection is established (eg, when the UE transmits an initial NAS message), the CM state is switched to the CM-CONNECTED state. If the CM state in the UE is in the CM-CONNECTED state, when the AN signaling connection is released, the CM state is changed to the CM-IDLE state.

If the CM state for the UE in the AMF is the CM-IDLE state, when the N2 context is established, the CM state is switched to the CM-CONNECTED state. If the CM state for the UE in the AMF is the CM-CONNECTED state, when the N2 context is released, the CM state is switched to the CM-IDLE state.

<Rrc State>

In LTE, RRC state includes RRC_IDLE state and RRC_CONNECTED state. In 5G, the RRC state may include an RRC_IDLE state, an RRC_CONNECTED state, and an RRC_INACTIVE state. That is, the RRC_INACTIVE state is newly defined in 5G.

The RRC_INACTIVE state may mean an RRC state in which the UE (eg, UE) is a Connected state in the core network, but is an IDLE state in radio aspect between the UE and the NG-RAN. For example, when the terminal is in the RRC_INACTIVE state, the terminal is in a state in which the RRC connection is released from the side of the radio, the terminal is in the MM (Mobility Management)-REGISTERED state, and in the CM (Connection Management)_CONNECTED state from the side of the core network.

When the RRC_INACTIVE state is used, when the terminal is switched from the RRC_INACTIVE state to the RRC_CONNECTED state, the core can provide a connection to the terminal quickly without the need for signaling that occurs when transitioning to the CONNECTED state. In addition, in radio aspect between the terminal and the NG-RAN, radio resources can be prevented from being wasted unnecessarily, so that radio resources can be efficiently used.

II. Disclosure of the Present Specification

The disclosures described in the present specification may be implemented in one or more combinations (e.g., combinations that include at least one of those described below). While each of the drawings illustrates an embodiment of each disclosure, the embodiments of the drawings may be implemented in combination with each other.

The disclosure of the present specification may comprise any combination of one or more of the actions/compositions/steps described below. The following methods described below may be performed or used combinatorially or complementarily.

When the UE is in the INACTIVE state, Control Plane (CP) signaling over SRB1 and SRB2 may be supported if NR SDT is used.

For example, for NR SDT when the UE is in the INACTIVE state, the following may be applied.

For the RRC_INACTIVE state:

UL SDT for RACH-based schemes (e.g., two-steps and four-steps RACH):

General procedures that enable the transmission of small data packets in the INACTIVE state (e.g., using MSGA or MSG3) may be supported. (For example, MSGA may be used for the transmission of the preamble and payload of a 2-step RA-type random access preamble, and MSG3 may be the response to an MSGA in a 2-step random access preamble);

To support User Plane (UP) data transmission in the UL, flexible payload size activation (actual payload size may be configured by network configuration) larger than the conventional Common Control Channel (CCCH) message size possible for the current INACTIVE state may be supported for MSGA and MSG3; and/or Context fetch and data delivery (with and without anchor relocation) in the INACTIVE state for RACH-based solutions may be supported.

If UL data transmission for preconfigured Physical uplink shared channel (PUSCH) resources (i.e., reuse of an established grant type 1)—TA is valid:

The general procedure for small data transfer over a grant type 1 resource configured in the INACTIVE state MAY be supported; and/or Configuration of a grant type 1 resource configured for small data transfer in the UL for the INACTIVE state may be supported.

If required, the RRM core requirements for small data transfer in RRC_INACTIVE may be specified.

The transfer of small data from the UL, the subsequent transfer of small data from the UL and DL, and the state transition decisions can be controlled by the network.

The framework for DRB can also be reused to specify SRB1 and SRB2 configurations for small data transfers in the RRC_INACTIVE state.

In addition, while the terminal is performing SDT, there may be situations where the same cell triggers the resume procedure again (e.g., due to the UL data generated from DRBs not configured for SDT) (i.e., when non-SDT UL data is generated) or a different cell triggers the resume procedure (e.g., due to cell re-selection).

Reuse of NCC and Inactive Radio Network Temporary Identifier (I-RNTI) for RRC Resume procedure in the same cell:

During the SDT procedure, how to handle data generated by DRBs that are not set up for SDT can be problematic. This is because non-SDT DRBs are not resumed at SDT initiation and are not reflected in the buffer status report.

One option is to trigger a new RRCResume procedure. For example, by sending an RRCResumeRequest message in the CCCH. Following the conventional procedure, a UE in RRC_INACTIVE may initiate the RRCResume procedure when it receives a request for UL data transfer from the UE's NAS layer.

However, if the RRCResume procedure has already been initiated for the SDT, this second ResumeRequest may reuse the I-RNTI and resumeMAC-I in the same cell because the UE has not received a new NCC. The UE may or may not have received a network response before generating the non-SDT data, i.e., before contention resolution.

It was not discussed whether a CCCH message reusing I-RNTI and resumeMAC-I could be sent again in the same cell after SDT initiation (e.g., it could be similar to the conventional RRC Reject case when no RRC Reject is received by the UE).

Reuse of NCC and I-RNTI for RRC resumption procedures in other cells:

According to the prior art, if the UE sends an RRCResumeRequest and performs cell reselection before receiving an RRC response message (e.g., RRCRelease or RRCResume), the UE may transition to the IDLE state. However, since the UE may send and receive multiple packets before cell reselection, data loss may occur if the RRCResume procedure has already been used to initiate the SDT procedure.

As an alternative approach, it has been discussed that the UE could remain INACTIVE and send an RRCResumeRequest message in a new cell. However, according to the prior art, the UE may be provided with an updated I-RNTI and NCC in a subsequent RRCRlease with a suspendConfig message. If the UE attempts a new SDT procedure in a new cell before completing the SDT procedure in the first cell, it will not receive the updated I-RNTI and NCC according to the current procedure. It may be discussed to temporarily allow the reuse of the previous cell's NCC and I-RNTI in order to start the SDT procedure/RRC resumption by sending another CCCH message in the new cell. It is unclear whether it is possible to start a new SDT procedure in a new cell by reusing the NCC and I-RNTI of the previous cell where the SDT procedure was started.

If a small data transmission (SDT) is initiated by a different NG-RAN located within the RAN-based Notification Area (RNA) than the old NG-RAN (=last serving NG-RAN) that has the UE context for the terminal, a method is required to support this. For example, the disclosure of the present specification describes an example of how a new NG-RAN and an old NG-RAN support SDT of a terminal in the above case.

Small Data Transmission (SDT), which transmits small amounts of data while keeping the terminal in RRC INACTIVE, is being discussed. For example, SDT can be implemented as RACH-based SDT (RA-SDT) or Configured Grant-Small Data Transmission (CG-SDT).

While SDT is in progress, the terminal may have non-SDT bearer data. In this case, the terminal interrupts SDT and starts the process of transitioning to RRC_CONNECTED state in order to pass the non-SDT bearer data to the network. If the NG-RAN is separated into gNB-DU and gNB-CU, the gNB-DU allocates resources and UE contexts for one terminal once again, even if the terminal already has resources and UE contexts allocated for RA-SDT. For example, the gNB-DU does not know that a terminal has started the process of transitioning to RRC_CONNECTED state during RA-SDT without additional information, so it allocates an additional resource and UE context for that terminal. This may result in resource wastage due to duplicate resource and UE context allocation.

The disclosure of the present specification begins by describing measures to prevent duplicate resource allocations and duplicate UE context allocations to avoid wasting resources.

The purpose of the disclosure of the present specification is to provide various examples of how to support SDT of terminals between New NG-RAN and old NG-RAN.

Among the N2 messages between the AMF and the NG-RAN described in the various disclosed examples below, new N2 messages may be defined and used for some of the N2 messages. Also, among the RRC messages between the NG-RAN and the UE described below, new RRC messages may be defined and used for some of the RRC messages.

In the procedures described in the various examples of the disclosure below, some actions/steps may be performed simultaneously/parallel, and others may be performed in a different order than the order described in the disclosure.

As an example of a procedure related to SDT, an example of a procedure for CG-based SDT will be described with reference to FIGS. 6a and 6b.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 6A:
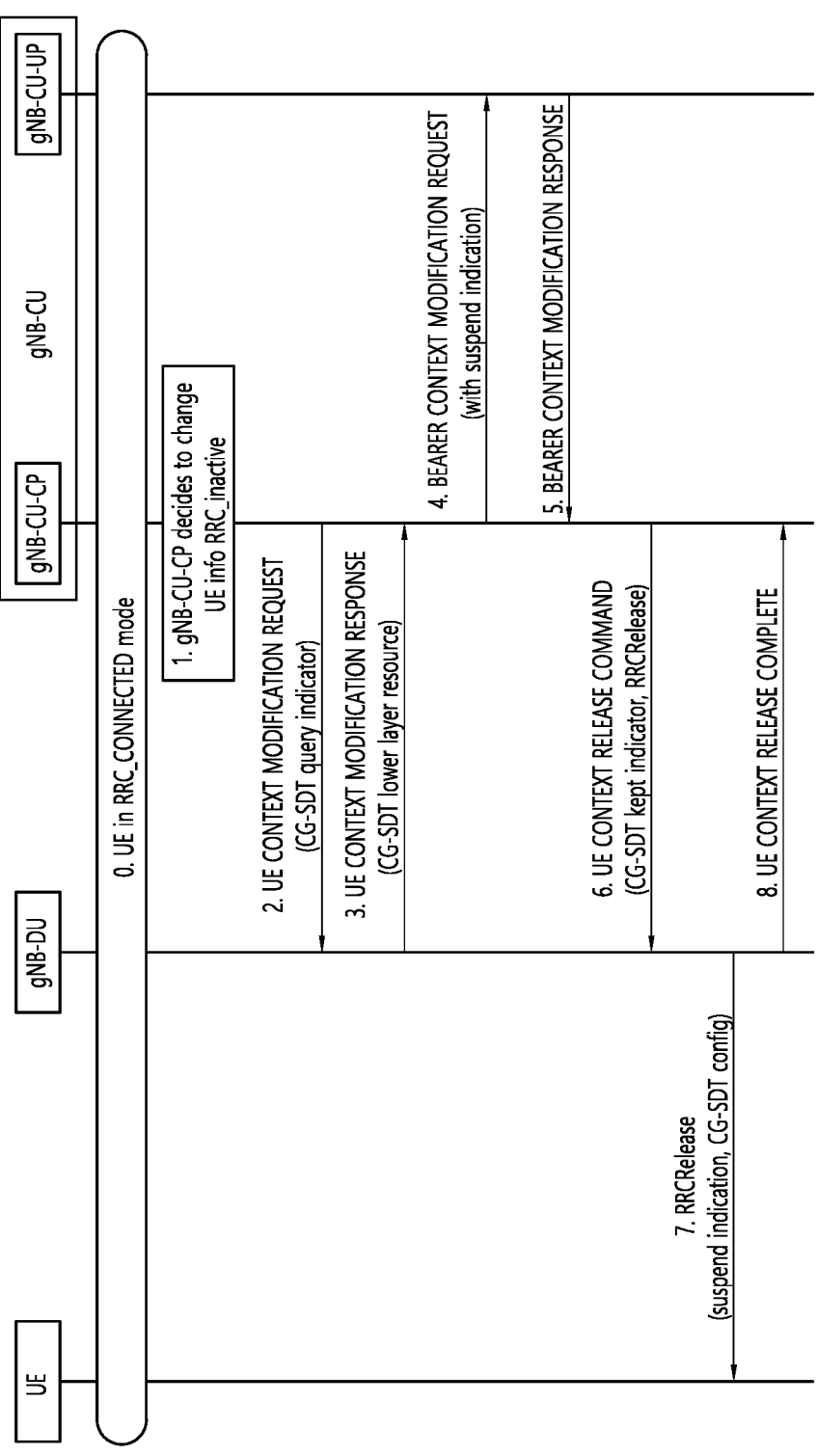
FIGS. 6a and 6b illustrate example procedures for CG-based SDT, according to one embodiment of the disclosure of the present specification.
Figure 6B:
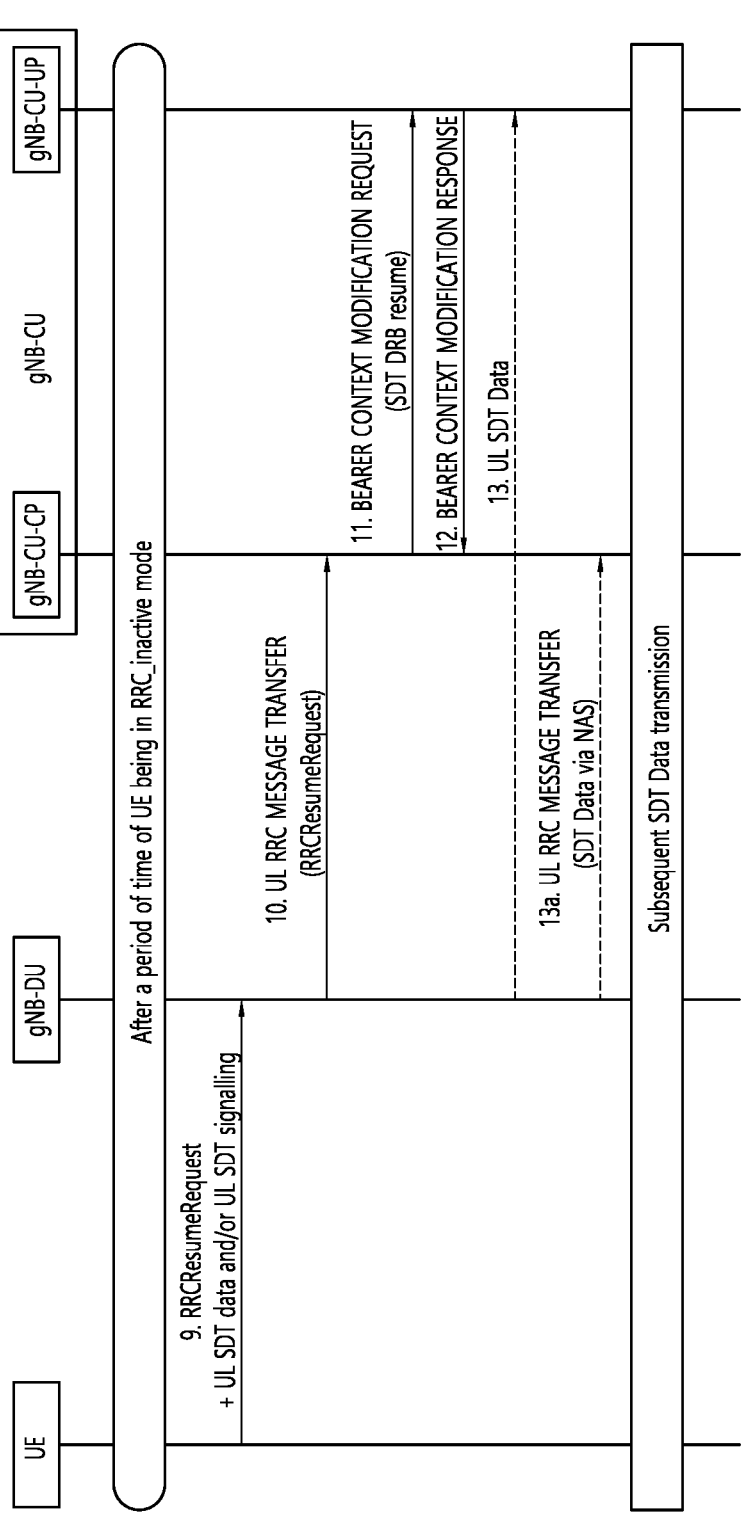

FIGS. 6a and 6b illustrate example procedures for CG-based SDT, according to one embodiment of the disclosure of the present specification.

Referring to FIGS. 6a and 6b, a base station (e.g., NG-RAN) may include a gNB-DU and a gNB-CU. The gNB-CU may include a gNB-CU-CP that performs functions related to the control plane and a gNB-CU-UP that performs functions related to the user plane.

The examples in FIG. 6a and FIG. 6b illustrate one example of a procedure for CG based SDT when the UE is in the RRC Inactive state.

1) The gNB-CU may decide to change the UE to the RRC_INACTIVE state.

2) The gNB-CU-CP decides to configure the CG-SDT and may send a UE CONTEXT MODIFICATION REQUEST message including a query indication for the configuration of CG-SDT related resources related to the information of the SDT Radio Bearer(s).

3) The gNB-DU may transmit a UE CONTEXT MODIFICATION RESPONSE message by including the CG-SDT related resource configuration for the SDT radio bearer(s) in the DU to CU RRC Information IE.

4) The gNB-CU-CP may transmit BEARER CONTEXT MODIFICATION REQUEST with suspend indication to the gNB-CU-UP.

5) The gNB-CU-UP may transmit BEARER CONTEXT MODIFICATION RESPONSE to the gNB-CU-CP.

6) The gNB-CU-CP may transmit a UE CONTEXT RELEASE COMMAND message including the RRCRelease message to the UE with the CG-SDT information in the suspend setting. When the UE enters the RRC_INACTIVE state with an explicit CG-SDT kept indicator, the gNB-CU may inform the gNB-DU to keep the SDT RLC settings, F1-U tunnel, F1AP UE connection and store CG resources for the SDT.

7) The gNB-DU may send the RRCRlease message to the UE.

8) The gNB-DU may send the UE CONTEXT RELEASE COMPLETE message. When the UE enters the RRC_INACTIVE state, the gNB-DU may maintain the SDT RLC settings, F1-U tunnel, F1AP UE association and store CG resources for the SDT. The gNB-DU may also store the C-RNTI, CS-RNTI and which bearer is the CG-SDT bearer.

After a period of time has elapsed after the UE has operated in RRC_INACTIVE mode, the following actions may be performed.

9) The UE may determine to perform the CG based SDT procedure and may send the RRCResumeRequest message with the UL SDT data/UL NAS protocol data unit (PDU).

10) The gNB-DU may transmit a UL RRC MESSAGE TRANSFER message including the RRCResumeRequest message.

11/12) The gNB-CU-CP may initiate the BEARER CONTEXT MODIFICATION procedure to resume SDT DRB.

13) The gNB-DU may forward UL SDT data to the gNB-CU-UP.

13a) The gNB-DU may forward RRC messages including UL NAS PDUs to the gNB-CU-CP using the UL RRC MESSAGE TRANSFER message.

In the procedures described in the various examples of the disclosure below, some actions/steps may be performed simultaneously/parallel, and others may be performed in a different order than the order described in the disclosure.

Hereinafter, the present disclosure is described with reference to a first example to a fifth example of the disclosure of the present specification. The first through fifth examples of the disclosure described below may be implemented in combination.

1. The First Example of the Disclosure of the Present Specification

Hereinafter, a first example of the disclosure of the present specification will be described with reference to the example of FIG. 7 and the examples of FIGS. 8a and 8b.

The first example of the disclosure of the present specification describes an example of an arrangement for supporting CP signaling in an SDT.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

FIG. 7 illustrates a signal flow diagram according to a first example of the first embodiment of the disclosure of the present specification.

For example, the example in FIG. 7 shows an example procedure for sending RRC messages over SRB2 in the RRC_INACTIVE state and forwarding NAS messages for SDT.

The example in FIG. 7 illustrates one example of how the New NG-RAN obtains the UE context from the Old NG-RAN when the terminal wants to send NAS PDUs or CP signaling to the network using SRB2 during SDT.

Basically, the example of FIG. 7 assumes that the New NG-RAN and the Old NG-RAN are not separated into CU-CP, CU-UP, and DU, but this is for illustrative purposes only. The example of FIG. 7 according to the disclosure of the present specification is also applicable when the New NG-RAN and/or the Old NG-RAN are separated into CU-CP, CU-UP, and DU, respectively.

Step 0: The terminal is currently in the RRC-INACTIVE state. Therefore, the terminal and the Old NG-RAN (=Last serving NG-RAN) may be storing the UE context respectively. Note that UE context can mean UE AS context in the example in FIG. 7. The NG-C connection between CU-CP and AMF is maintained, and the NG-U connection between CU-UP and UPF may also be maintained.

Step 1: The terminal may initiate the RACH procedure to exchange CP signaling with the network in an SDT manner, while remaining in the RRC-INACTIVE state.

Step 2: The terminal may send an RRC Resume Request message to the New NG-RAN for SDT transmission related to CP signaling. In this process, the terminal may include an indication to indicate that the current SDT transmission was initiated for CP signaling or NAS PDU transmission and not for UP data. This indication may be transmitted in the form of a Resume Cause, or it may be transmitted using MAC CE.

During this process, the terminal can resume both the bearer for SDT and SRB 2.

NOTE: As in Step 2, the terminal may generate and transmit an indication to indicate that SDT has been initiated for CP signaling. Alternatively, after initiating the RACH procedure for SDT in Step 1, if the terminal sends a resume cause to the network in Step 2, such as MO signaling, the NG-RAN may infer from the combination that SDT for CP signaling has been initiated. For example, the NG-RAN may infer that the SDT for CP signaling has been started based on that the RACH procedure for SDT has been started and the terminal has sent a Resume Cause.

NOTE: When a terminal transitions from Old NG-RAN (=Last Serving NG-RAN) to RRC-INACTIVE, the terminal can know in advance whether it needs to resume SRB 2 together with the SDT transmission process via the SuspendConfig included in the RRC Release message. For example, the SuspendConfig may indicate the settings for the RRC_Inactive state.

Step 3: The New NG-RAN checks whether it has a UE context for the terminal based on the I-RNTI included in the RRC Resume Request message. If it fails to find the UE context, the New NG-RAN may request the UE context by sending a RETRIEVE UE CONTEXT REQUEST message to the Old NG-RAN (=Last Serving NG-RAN) that has the UE context based on the I-RNTI. During this process, for CP signaling, the New NG-RAN may include an indication to indicate that SDT has started.

Step 4: Upon receiving the RETRIEVE UE CONTEXT REQUEST message from the New NG-RAN, the Old NG-RAN can verify that it has the UE context for the terminal. If the Old NG-RAN has the corresponding UE context and has verified the terminal, it can decide whether to forward the UE context to the New NG-RAN. The Old NG-RAN may decide to pass the UE context to the New NG-RAN because it has been informed by the New NG-RAN that it is an SDT for CP signaling.

Step 5: The old NG-RAN may deliver the UE context for the terminal to the new NG-RAN via a RETRIEVE UE CONTEXT RESPONSE message.

Step 6: The New NG-RAN may proceed with contention resolution to the terminal through DCI. It can also allocate resources for the New NG-RAN UL so that the terminal can transmit NAS PDUs.

NOTE: New NG-RAN may also use the new RRC message instead of DCI to notify terminals.

Step 7: If the New NG-RAN receives that the Old NG-RAN is buffering DL data to be sent to the terminal in Step 5, the New NG-RAN can forward the data forwarding address to the Old NG-RAN to obtain the buffered DL data from the Old NG-RAN.

Step 8: The new NG-RAN can send a Path Switch Request message to the AMF to indicate that the new NG-RAN has become the serving NG-RAN for the terminal.

Step 9: The AMF may respond by sending a Path Switch Request Ack message to the New NG-RAN.

Step 10: The terminal may forward the UL Information Transfer message including the NAS PDU to the New NG-RAN via SRB2.

Step 11: The New NG-RAN may forward the NAS PDUs received from the terminal to the AMF via UL NAS TRANSPORT message.

Step 12: If the AMF has a NAS PDU that needs to be delivered to the terminal, it can forward a DL NAS TRANS-PORT message including the NAS PDU to the New NG-RAN.

Step 13: If the NAS PDU is received from the AMF via Step 12, the new NG-RAN may forward the NAS PDU to the terminal via a DL Information Transfer message including the NAS PDU.

Step 14: When the new NG-RAN determines that it has finished sending data or signaling to the terminal, it may forward an RRC Release message with SuspendConfig to the terminal. This allows the terminal to terminate the SDT procedure and remain in the RRC-INACTIVE state.

The following drawings are intended to illustrate specific embodiments of the present disclosure. The designations of specific devices or the designations of specific signals/ messages/fields shown in the drawings are for illustrative purposes only, and the technical features of this specification are not limited to the specific designations used in the drawings below.

FIGS. 8a and 8b illustrate signal flow diagrams according to a second example of the first example of the disclosure of the present specification.

For example, the examples in FIG. 8a and FIG. 8b illustrate example procedures for sending RRC messages over SRB2 in the RRC_INACTIVE state, for SDT, and for forwarding NAS messages.

The examples in FIG. 8a and FIG. 8b illustrate one example of how the New NG-RAN obtains the UE context from the Old NG-RAN when the terminal wants to send NAS PDUs or CP signaling to the network using SRB2 during SDT, in a situation in which the CU-DU split is considered.

By default, the examples of FIGS. 8a and 8b assume that the New NG-RAN and the Old NG-RAN are not separated into CU-CP, CU-UP, and DU, but this is for illustrative purposes only. The examples of FIG. 8a and FIG. 8b according to the disclosure of the present specification are also applicable when the New NG-RAN and/or the Old NG-RAN are separated into CU-CP, CU-UP, and DU, respectively.

For reference, the examples of FIGS. 8a and 8b may include the same content as the example of FIG. 7, and the following discussion will focus on the differences between the examples of FIGS. 8a and 8b and the example of FIG. 7.

In the examples of FIGS. 8a and 8b, the new NG-RAN may include a DU (e.g., gNB-DU) and a CU (e.g., gNB-CU).

Steps 0-1: This can be performed in the same way as the example in FIG. 7.

Step 2: The terminal may send an RRC Resume Request message to the New NG-RAN for SDT transmission related to CP signaling. In this process, the terminal may include an indication to indicate that the current SDT transmission was initiated for CP signaling or NAS PDU transmission and not for UP data. This indication may be transmitted in the form of a Resume Cause, or it may be transmitted using MAC CE.

In this process, the terminal can resume both the bearer for SDT and SRB 2. The terminal can forward a UL Information Transfer message containing the NAS PDU through SRB 2 to the New NG-RAN with an RRC Resume Request message.

NOTE: As in Step 2, the terminal may generate and transmit an indication to indicate that SDT has been initiated for CP signaling. Alternatively, after initiating the RACH procedure for SDT in Step 1, if the terminal sends a resume cause to the network in Step 2, such as MO signaling, the NG-RAN may infer from the combination that SDT for CP signaling has been initiated. For example, the NG-RAN may infer that the SDT for CP signaling has been started based on that the RACH procedure for SDT has been started and the terminal has sent a Resume Cause. Alternatively, the terminal may send a UL Information Transfer with the RRC Resume Request message instead of the "SDT for MO signaling" indication to indicate to the NG-RAN that SDT has been initiated for CP signaling.

NOTE: When a terminal transitions from Old NG-RAN (=Last Serving NG-RAN) to RRC-INACTIVE, the terminal can know in advance whether it needs to resume SRB 2 together with the SDT transmission process via the Sus-pendConfig included in the RRC Release message.

Step 3: The DU of the new NG-RAN may include the RRC Resume Request message in the F1 Application Pro-tocol (F1AP) INITIAL UL RRC MESSAGE TRANSFER message and forward it to the CU of the new NG-RAN. In order to deliver the UL-DCCH message (i.e., UL Informa-tion Transfer) transmitted by the terminal with the RRC Resume Request message to the CU of the New NG-RAN, the DU of the New NG-RAN may include an indication requesting the establishment of SRB2 and forward the indication with the F1 Application Protocol (F1AP) INI-TIAL UL RRC MESSAGE TRANSFER message.

NOTE: Instead of SRB2 Required Indication, the DU of the New NG-RAN may include the UL-DCCH message (i.e., UL Information Transfer), received from the terminal, in the RRC container in the F1AP INITIAL UL RRC MESSAGE TRANSFER message and forward it to the CU of the New NG-RAN. In this case, when the CU of the New NG-RAN sends the XnAP RETRIEVE UE CONTEXT REQUEST message to the Old NG-RAN in Step 4, it can include the UL-DCCH message (i.e., UL Information Trans-fer) received from the DU of the New NG-RAN in Step 3 and forward it to the Old NG-RAN. If the UE verification passes in Step 5, the Old NG-RAN can immediately forward the NAS-PDU to the AMF after receiving the NAS-PDU based on the UL Information Transfer sent by the terminal. If the AMF delivers DL data (e.g., NAS-PDU or CP signal-ing) to the Old NG-RAN, the Old NG-RAN generates a DL Information Transfer and delivers the DL data (e.g., NAS-PDU or CP signaling) received from the AMF to the New NG-RAN in the form of an RRC container in the RETRIEVE UE CONTEXT RESPONSE message or a new XnAP message in Step 6.

In this case, the Old NG-RAN still maintains the role of serving NG-RAN for the terminal, and can instead maintain CP signaling with the terminal through the New NG-RAN. In this case, to create an Xn tunnel to receive NAS-PDUs from the New NG-RAN, the Old NG-RAN can include the relevant information and forward it to the New NG-RAN. In this case, Steps 12 and 13 can be omitted because NG signaling with AMF is still done through the Old NG-RAN.

Step 4: Upon receiving the RETRIEVE UE CONTEXT REQUEST message from the New NG-RAN, the Old NG-RAN can verify that it has the UE context for the terminal. If the Old NG-RAN has the corresponding UE context and has verified the terminal, it can decide whether to forward the UE context to the New NG-RAN. Since it has been informed by the New NG-RAN that it is an SDT for CP signaling, the Old NG-RAN may decide to pass the UE context to the New NG-RAN. During this process, the CU of the New NG-RAN may realize that SRB2 setup is required based on the "SDT for MO signaling" indication and/or SRB2 Required Indication. Therefore, the New NG-RAN conveys an indication to the Old NG-RAN to inform it that SDT for CP signaling has been initiated.

NOTE: In Step 2, the terminal may send UL Information Transfer with RRC Resume Request message instead of "SDT for MO signaling" indication. In this case, the CU of the New NG-RAN can recognize that the terminal has initiated SDT for CP signaling from the SRB2 Required Indication sent by the DU of the New NG-RAN in Step 3.

NOTE: CU of the New NG-RAN may also transmit the "SDT for MO signaling" indication and/or SRB2 Required Indication by including it in the RETRIEVE UE CONTEXT REQUEST message.

Step 5: This can be performed in the same way as step 4 in the example in FIG. 7.

Step 6: This can be performed in the same way as step 5 in the example in FIG. 7.

NOTE: The Old NG-RAN may pass only partial UE context (e.g., SRB2 related information) to the New NG-RAN instead of full UE context. In this case, the Old NG-RAN still maintains the role of serving NG-RAN for the terminal and can instead maintain CP signaling with the terminal through the New NG-RAN. In this case, the Old NG-RAN may forward the NAS-PDU to the New NG-RAN with relevant information to create an Xn tunnel to receive the NAS-PDU from the New NG-RAN. If the Old NG-RAN provides the Partial UE context to the New NG-RAN, Steps 12 and 13 can be omitted because the NG signaling with the AMF is still performed through the Old NG-RAN.

Instead of forwarding partial UE context (e.g., SRB2 related information) to the New NG-RAN, the Old NG-RAN may forward information to create an Xn tunnel between the Old NG-RAN and the New NG-RAN to receive UL-DCCH messages sent by the terminal and an F1 tunnel between the DU and CU, to the New NG-RAN. In this case, the CU of the New NG-RAN may create an F1 tunnel for UL-DCCH message forwarding instead of creating an SRB2 in Step 7. In this process, the CU of the New NG-RAN may also create an F1 tunnel for DL-DCCH message delivery so that the AMF can deliver DL-DCCH messages (i.e., DL Information Transfer including DL data) to the terminal.

Step 7: Based on the UE context received in Step 6, the CU in the New NG-RAN may request SRB2 setup from the DU in the New NG-RAN via F1AP UE CONTEXT SETUP REQUEST message.

Step 8: This can be performed in the same way as step 6 in the example in FIG. 7.

Step 9: After the DU of the new NG-RAN completes the SRB2 setup, it can respond to the CU of the new NG-RAN via the F1AP UE CONTEXT SETUP RESPONSE message.

Step 10: The DU of the New NG-RAN can forward the UL Information Transfer message received in Step 2 to the CU in the New NG-RAN by including it in the F1AP UL RRC MESSAGE TRANSFER.

Step 11: If the CU of the new NG-RAN receives that the old NG-RAN is buffering the DL data to be transmitted to the terminal in Step 6, the new NG-RAN can forward the data forwarding address to the old NG-RAN to obtain the buffered DL data from the old NG-RAN.

NOTE: There may be cases where the DU of the New NG-RAN has included the UL-DCCH message in the INITIAL UL RRC MESSAGE TRANSFER, and forward it to the CU of the New NG-RAN in Step 3, or where the Old NG-RAN has forwarded partial UE context in Step 6. In this case, in order to create a tunnel to receive NAS-PDU from the AMF to be forwarded to the terminal, the CU of the New NG-RAN may include relevant information in the MESSAGE TRANSFER and forward it to the CU of the Old NG-RAN. At this time, the new XnAP RRC MESSAGE TRANSFER can also be used to forward the UL Information Transfer received by the CU of the New NG-RAN to the Old NG-RAN.

The New NG-RAN may create an Xn tunnel between the Old NG-RAN and the New NG-RAN to receive DL-DCCH messages so that the Old NG-RAN can forward DL-DCCH messages (i.e., DL Information Transfer including DL data) to be sent to the terminal by the AMF.

Step 12: The CU of the new NG-RAN may send a Path Switch Request message to the AMF to indicate that the new NG-RAN has become the serving NG-RAN for the terminal.

Step 13: The AMF can respond by sending a Path Switch Request Ack message to the CU of the New NG-RAN.

Step 14: The CU of the New NG-RAN can forward the NAS PDUs received from the terminal to the AMF via UL NAS TRANSPORT message.

NOTE: If the DU of the New NG-RAN included the UL-DCCH message in the INITIAL UL RRC MESSAGE TRANSFER in Step 3 and forwarded it to the CU of the New NG-RAN, or if the Partial UE context was forwarded by the old NG-RAN to the new NG-RAN in Step 6, Steps 14 and 15 may be performed between the Old NG-RAN and the AMF.

Step 15: If the AMF has a NAS PDU that needs to be delivered to the terminal, it can forward a DL NAS TRANSPORT message containing the NAS PDU to the New NG-RAN.

Steps 16-17: If the NAS PDU is received from the AMF via Step 15, the CU of the new NG-RAN may forward the DL Information Transfer message containing the NAS PDU to the DU of the new NG-RAN by including it in an F1AP DL RRC MESSAGE TRANSFER message. The DU of the new NG-RAN can forward the DL Information Transfer message to the terminal.

NOTE: There may be cases where the DU of the New NG-RAN included the UL-DCCH message in the INITIAL UL RRC MESSAGE TRANSFER in Step 3 and forwarded it to the CU of the New NG-RAN, or where the Old NG-RAN forwarded only partial UE context in Step 6. In this case, the Old NG-RAN generates an RRC message and delivers the RRC message to the New NG-RAN using an XnAP RRC MESSAGE TRANSFER message, and the New NG-RAN can forward it to the terminal. Conversely, the UL Information Transfer received from the terminal can be received by the New NG-RAN and forwarded to the Old NG-RAN.

Steps 18-19: When the CU of the new NG-RAN determines that it has finished sending data or signaling to the terminal, it may forward an RRC Release message including SuspendConfig to the terminal through the DU of the new NG-RAN. This allows the terminal to terminate the SDT process and remain in the RRC-INACTIVE state.

2. The Second Example of the Disclosure of the
Present Specification

Hereinafter, a second example of the disclosure of the present specification will be described with reference to the example of FIG. 9 and the examples of FIGS. 10*a* and 10*b*.

The second example of the disclosure of the present specification describes one example of a procedure when non-SDT data is encountered in a situation where SDT is used. The second example of the disclosure of the present specification includes an example of a procedure that triggers an RRC Resume procedure in the same cell.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

FIG. 9 illustrates a signal flow diagram according to the first example of the second example of the disclosure of the present specification.

For example, the example of FIG. 9 illustrates an example of a procedure that supports triggering an RRC Resume procedure in the same cell. The example of FIG. 9 may represent a situation after an SDT has been used in which an anchor relocation has been performed.

The example in FIG. 9 shows an example of how a terminal can trigger the resume procedure again in the cell where SDT is currently in progress when it has data that needs to be transmitted over a non-SDT bearer.

Basically, the example in FIG. 9 assumes that the Old NG-RAN has provided the UE context to the New NG-RAN during the SDT setup process.

Also, the example in FIG. 9 assumes that only the New NG-RAN is separated into CU-CP, CU-UP, and DU, but this is only an example. For example, the example in FIG. 9 may also apply if the Old NG-RAN is also separated into CU-CP, CU-UP, and DU.

Step 0: This can be performed in the same way as Step 0 in the example in FIG. 7.

Step 1: The terminal is performing SDT with the New NG-RAN in the RRC-INACTIVE state. In other words, in the procedure of Step 1, the Old NG-RAN has passed the UE context to the New NG-RAN. Therefore, the serving NG-RAN for the terminal may be the new NG-RAN. The new NG-RAN can only resume SDT bearer to support SDT for the terminal.

Step 2: The terminal may have data for a non-SDT bearer. For example, data for non-SDT may occur. For example, if the data for the non-SDT bearer is present, the terminal may decide to execute the resume procedure according to the prior art to transition to the RRC-CONNECTED state. Therefore, the terminal may send an RRC Resume Request message back to the NG-RAN from the cell in which it is currently residing.

Step 3: The DU of the New NG-RAN may include the RRC message received from the terminal in the INITIAL UL RRC MESSAGE TRANSFER message and forward it to the CU-CP of the New NG-RAN. In this process, the DU of the New NG-RAN may assign a new lower layer configuration for the terminal and forward the new lower layer configuration to the CU-CP of the New NG-RAN with the INITIAL UL RRC MESSAGE TRANSFER message. Since the gNB-DU does not yet know that a UE context for the terminal already exists within the gNB-DU, it may assign a new lower layer configuration to create a new RRC connection with the terminal.

Step 4: Based on the Inactive Radio Network Temporary Identifier (I-RNTI) information included in the RRC Resume Request message, the CU-CP of the New NG-RAN knows that the terminal has executed the resume process again to transition to the RRC-CONNECTED state during the SDT transmission. Since the New NG-RAN has already received the UE context for the terminal from the Old NG-RAN in Step 1, the CU-CP of the New NG-RAN may decide to transition the terminal to the RRC-CONNECTED state based on the UE context and decide to resume for the non-SDT bearer.

The CU-CP of the New NG-RAN may perform verification of the Short Resume MAC-I sent by the terminal. For example, in order to obtain the count value to be used in the process of verifying the Short Resume MAC-I sent by the terminal through the E1 Application protocol (E1AP) message, the CU-CP of the New NG-RAN may request from the CU-UP of the New NG-RAN the UL/DL COUNT value that the CU-UP of the New NG-RAN has exchanged with the terminal to date.

Step 5: The CU of the New NG-RAN (e.g., CU-CP) may send request messages related to UE CONTEXT to the DU of the New NG-RAN. By sending such a request message, the CU-CP of the New NG-RAN can request the configuration of the Non-SDT bearer. For example, the CU-CP of the New NG-RAN may request the setup of a non-SDT bearer (e.g., Bearer configuration, F1 UL TEIDs) by sending a UE CONTEXT related request message (e.g., UE CONTEXT MODIFICATION REQUEST message) to the DU of the New NG-RAN. In this case, the CU (e.g., CU-CP) of the New NG-RAN may include the old gNB-DU UE F1AP ID established by the DU of the New NG-RAN during the SDT process for that terminal. For example, the CU (e.g., CU-CP) of the New NG-RAN may send a request message to the DU of the New NG-RAN related to the UE CONTEXT including information about the old SDT session (e.g., old gNB-DU UE F1AP ID). The DU of the new NG-RAN will then know that the terminal is attempting to establish a non-SDT bearer in addition to the SDT bearer. The DU of the New NG-RAN utilize the SDT bearer, CG configuration (e.g., SDT resource configuration), etc. that it has set up for the terminal. For example, a DU of the New NG-RAN may receive a request message from a CU (e.g., CU-CP) of the New NG-RAN related to UE CONTEXT including information about an old SDT session (e.g., old gNB-DU UE F1AP ID). If the request message related to UE CONTEXT includes information about the old SDT session (e.g., old gNB-DU UE F1AP ID), the DU of the New NG-RAN may retrieve the old SDT resource configuration and the old UE context based on the information about the old SDT session (e.g., old gNB-DU UE F1AP ID). Accordingly, the DU in the New NG-RAN may use the old SDT resource configuration and the old UE context.

NOTE: For reference, the DU of the New NG-RAN may also release configuration information for SDT bearers or terminals that it has established during the SDT process. For example, the DU of the New NG-RAN may release all the configuration information for the SDT bearer or the corresponding terminal that was established during the SDT process based on the old gNB-DU UE F1AP ID in a request message related to UE CONTEXT (e.g., UE CONTEXT MODIFICATION REQUEST message). The DU of the New NG-RAN may also re-setup all bearers based on the newly included configuration information in the request message related to UE CONTEXT (e.g., UE CONTEXT MODIFI-CATION REQUEST message).

NOTE: The CU-CP of the New NG-RAN may, instead of the UE CONTEXT MODIFICATION REQUEST message, command the DU to release all information set up during the SDT process for that terminal via the UE CONTEXT RELEASE procedure. The CU-CP of the New NG-RAN may then request the DU to set up all bearers again via the UE CONTEXT SETUP process.

Step 6: The DU of the new NG-RAN may finish the bearer setup for the terminal according to the message received from the CU-CP in Step 5 and respond by sending the UE CONTEXT MODIFICATION RESPONSE message.

Step 7: The CU-CP of the New NG-RAN may send a BEARER CONTEXT MODIFICATION REQUEST message to the CU-UP to indicate that the terminal will attempt to transmit data over a non-SDT bearer and thus the terminal will transition to the RRC-CONNECTED state. At this time, a new "Connected transition" indication may be added to indicate that the situation has changed from resuming only some bearers for the terminal for SDT to resuming all bearers. For example, the CU-CP of the New NG-RAN may send a BEARER CONTEXT MODIFICATION REQUEST message to the CU-UP that includes the "Connected tran-sition" indication. Alternatively, the SDT process in Step 1 may utilize the "SDT resume" indication to signal the process of resuming only the SDT bearer, while the CU-CP in the New NG-RAN may utilize the existing Resume indication for the RRC-CONNECTED state transition in Step 7.

In this process, the CU-CP of the New NG-RAN may forward DL TEIDs information for non-SDT bearers received from the DU together.

Step 8: The CU-UP of the New NG-RAN may respond by sending a BEARER CONTEXT MODIFICATION RESPONSE message after updating the Bearer Context according to the CU-CP request received in Step 7.

Step 9: The CU-CP of the new NG-RAN may generate an RRC Resume message to inform the terminal of the transi-tion to the RRC-CONNECTED state. The CU-CP of the New NG-RAN may deliver the RRC Resume message to the terminal by forwarding a DL RRC MESSAGE TRANSFER containing the RRC Resume message to the DU.

NOTE: It is possible for Steps 7 and 9 to be performed simultaneously, or for Step 9 to be performed first.

Step 10: The DU of the new NG-RAN can forward the RRC Resume message received in Step 9 to the terminal. Based on the RRC Resume message, the terminal may resume all bearers and transition to the RRC-CONNECTED state. The terminal may transmit UL data existing on the non-SDT bearer to the NG-RAN.

Step 11: The terminal may respond by sending an RRC Resume Complete message to the New NG-RAN.

Step 12: The DU of the New NG-RAN may forward the RRC message sent by the terminal to the CU-CP of the New NG-RAN via UL RRC MESSAGE TRANSFER.

The following drawings are intended to illustrate specific embodiments of the present disclosure. The designations of specific devices or the designations of specific signals/ messages/fields shown in the drawings are for illustrative purposes only, and the technical features of this specification are not limited to the specific designations used in the drawings below.

FIGS. 10a and 10b illustrate signal flow diagrams accord-ing to the second example of the second example of the disclosure of the present specification.

For example, the examples of FIGS. 10a and 10b illus-trate an example of a procedure that supports triggering an RRC Resume procedure in the same cell. The examples of FIGS. 10a and 10b may represent a situation after SDT without anchor relocation has been used.

The examples in FIG. 10a and FIG. 10b illustrate an example of how a terminal can trigger the resume procedure again in a cell where SDT is currently in progress when the terminal has data to transmit over a non-SDT bearer.

Basically, the examples in FIGS. 10a and 10b assume that the Old NG-RAN has provided the New NG-RAN with UE context during the SDT setup process.

Also, the examples of FIGS. 10a and 10b assume that only the New NG-RAN is separated into CU-CP, CU-UP, and DU, but this is for illustrative purposes only. For example, the example of FIG. 9 may also apply if the Old NG-RAN is also separated into CU-CP, CU-UP, and DU.

Step 0: This can be performed in the same way as Step 0 in the example in FIG. 7.

Step 1: The terminal is performing SDT with the Old NG-RAN via the New NG-RAN in the RRC-INACTIVE state. Therefore, the serving NG-RAN for the terminal is still the Old NG-RAN, and the New NG-RAN can support SDT for the terminal by configuring only the RLC, MAC, and PHY layers for the SDT bearer.

Step 2: The terminal may have data for a non-SDT bearer. For example, data for non-SDT may occur. For example, if the data for the non-SDT bearer exists, the terminal may decide to execute the resume procedure according to the prior art to transition to the RRC-CONNECTED state. Therefore, the terminal may send an RRC Resume Request message back to the NG-RAN from the cell in which it is currently residing.

Step 3: This can be performed in the same way as step 3 in the example in FIG. 9.

Step 4: Based on the I-RNTI information included in the RRC Resume Request message, the CU-CP of the new NG-RAN knows that the terminal has executed the resume process again to transition to the RRC-CONNECTED state during the SDT transmission. However, since the old NG-RAN still has the UE context for the terminal, the CU-CP of the New NG-RAN may send a RETRIEVE UE CONTEXT REQUEST message the old NG-RAN again.

Step 5: After receiving the RETRIEVE UE CONTEXT REQUEST message from the New NG-RAN, the Old NG-RAN can verify that it has the UE context for the terminal. The Old NG-RAN may perform a validation of the terminal. If it has the corresponding UE context and the validation of the terminal is complete, the Old NG-RAN can decide whether to forward the UE context to the New NG-RAN. During the procedure of the SDT being performed for that terminal, based on the resume cause sent by the terminal and based on that the old NG-RAN has once again received an RRC Resume Request message from the same terminal, the old NG-RAN may know that the terminal has data that needs to be transmitted over a non-SDT bearer. Accordingly, the old NG-RAN may decide to forward the UE context to the new NG-RAN in order to transition the terminal to the RRC-CONNECTED state.

Step 6: Based on the decision in Step 5, the old NG-RAN may include the UE context in the RETRIEVE UE CON-TEXT RESPONSE message and forward it to the CU-CP of the new NG-RAN.

Step 7: The CU-CP of the New NG-RAN may send a BEARER CONTEXT SETUP REQUEST message to the CU-UP based on the UE context.

Step 8: The CU-UP of the New NG-RAN may respond to the CU-CP by sending a BEARER CONTEXT SETUP RESPONSE message. In doing so, the CU-UP of the New NG-RAN may assign F1 UL TEIDs to be forwarded to the New NG-RAN and include F1 UL TEIDs in the message. For example, the CU-UP of the New NG-RAN may send a BEARER CONTEXT SETUP RESPONSE message to the CU-CP that includes the assigned F1 UL TEIDs, and the CU-CP may send a BEARER CONTEXT SETUP RESPONSE message to the DU.

Step 9: The CU of the New NG-RAN (e.g., CU-CP) may send request messages related to UE CONTEXT to the DU of the New NG-RAN. By sending such a request message, the CU-CP of the New NG-RAN may request settings (e.g., setup) for the Non-SDT bearer. The CU of the New NG-RAN (e.g., CU-CP) may request the setup of non-SDT bearers (e.g., Bearer configuration, F1 UL TEIDs) by sending a UE CONTEXT related request message (e.g., UE CONTEXT MODIFICATION REQUEST message) to the DU of the New NG-RAN. In this case, the CU (e.g., CU-CP) of the New NG-RAN may transmit the old gNB-DU UE F1AP ID established by the DU of the New NG-RAN during the SDT process for that terminal. For example, the CU (e.g., CU-CP) of the New NG-RAN may send a request message to the DU of the New NG-RAN related to the UE CON-TEXT containing information about the old SDT session (e.g., old gNB-DU UE F1AP ID). The DU of the new NG-RAN will then know that the terminal is attempting to establish a non-SDT bearer in addition to the SDT bearer. The DU of the New NG-RAN can still utilize the SDT bearer, CG configuration (e.g., SDT resource configuration), etc. that the DU of the New NG-RAN has set up for the terminal. For example, a DU of the New NG-RAN may receive a request message from a CU (e.g., CU-CP) in the New NG-RAN related to UE CONTEXT including infor-mation about an old SDT session (e.g., old gNB-DU UE F1AP ID). If the request message related to UE CONTEXT includes information about the old SDT session (e.g., old gNB-DU UE F1AP ID), the DU of the New NG-RAN may retrieve the old SDT resource configuration and the old UE context based on the information about the old SDT session (e.g., old gNB-DU UE F1AP ID). Accordingly, the DU in the New NG-RAN may use the old SDT resource configu-ration and the old UE context.

In addition, in Step 8, the CU of the New NG-RAN (e.g., CU-CP) can forward the F1 UL TEIDs information assigned by the CU-UP to the DU, so that UL transmissions for that terminal are directed to the CU-UP in the New NG-RAN rather than the old NG-RAN.

NOTE: For reference, the DU of the New NG-RAN may also release configuration information for SDT bearers or terminals that it has established during the SDT process. For example, the DU of the New NG-RAN may release all the configuration information for the SDT bearer or the corre-sponding terminal that was established during the SDT procedure based on the old gNB-DU UE F1AP ID in a request message related to UE CONTEXT (e.g., UE CON-TEXT MODIFICATION REQUEST message). The DU of the New NG-RAN may also re-setup all bearers based on the newly included configuration information in the request message related to UE CONTEXT (e.g., UE CONTEXT MODIFICATION REQUEST message).

NOTE: In step 4, the CU-CP of the new NG-RAN knows that the terminal has executed the resume process again to transition to the RRC-CONNECTED state during the SDT transmission procedure. Therefore, after step 4, the CU-CP of the New NG-RAN, instead of sending the UE CONTEXT MODIFICATION REQUEST message to the DU of the New NG-RAN, may instruct the DU to release all the information set during the SDT process for the terminal based on the UE CONTEXT RELEASE process. Subse-quently, the CU-CP in the New NG-RAN may request the setup of all bearers from the DU again through the UE CONTEXT SETUP process.

Step 10: The DU of the new NG-RAN finishes the bearer setup for the terminal according to the message received from the CU-CP in Step 9 and may respond by sending a UE CONTEXT MODIFICATION RESPONSE message.

Step 11~12: After the CU-CP of the new NG-RAN generates the RRC Resume message to inform the terminal of the transition to the RRC-CONNECTED state, the CU-CP of the new NG-RAN can deliver the RRC Resume message to the terminal by forwarding a DL RRC MES-SAGE TRANSFER including the RRC Resume message to the DU.

The DU of the New NG-RAN may forward the RRC Resume message received in Step 11 to the terminal. Based on the RRC Resume message, the terminal may resume all bearers and transition to the RRC-CONNECTED state. The terminal may transmit UL data existing on the non-SDT bearer to the NG-RAN.

NOTE: Steps 11 and 15 may be performed at the same time, or Step 15 may be performed before Step 11.

Steps 13-14: The terminal may respond by sending an RRC Resume Complete message to the new NG-RAN. The DU of the new NG-RAN may forward the RRC message sent by the terminal to the CU-CP of the new NG-RAN via UL RRC MESSAGE TRANSFER.

Step 15: The CU-CP of the New NG-RAN may forward the DL TEIDs information received from the DU in Step 10 to the CU-UP based on the Bearer Context Modification procedure.

Step 16: The New NG-RAN may receive that the Old NG-RAN is buffering the DL data to be transmitted to the terminal in Step 6. In this case, the new NG-RAN can forward the data forwarding address to the old NG-RAN to receive the buffered DL data from the old NG-RAN.

Step 17: The CU-CP of the new NG-RAN may send a Path Switch Request message to the AMF to indicate that the new NG-RAN has become the serving NG-RAN for the terminal. The AMF may respond by sending a Path Switch Request Ack message to the new NG-RAN.

3. A Third Example of the Disclosure of the Present Specification

Hereinafter, a third example of the disclosure of the present specification will be described with reference to the example of FIG. 11.

A third example of the disclosure of the present specifi-cation includes an example of a procedure that triggers the RRC Resume procedure in other cells.

The following drawings are intended to illustrate specific embodiments of the present disclosure. The designations of specific devices or the designations of specific signals/ messages/fields shown in the drawings are for illustrative purposes only, and the technical features of this specification are not limited to the specific designations used in the drawings below.

FIG. 11 illustrates a signal flow diagram according to the first example of the second example of the disclosure of the present specification.

The example of FIG. 11 illustrates an example of a method for triggering an SDT again when a terminal accesses another cell through cell reselection in the middle of an SDT process (e.g., while the terminal is performing a procedure related to the SDT or while the terminal is performing a communication using the SDT).

Basically, the example in FIG. 11 assumes that the terminal has moved to a cell in a different NG-RAN through cell reselection, but this is for illustrative purposes only, i.e., the example in FIG. 11 may also apply if the terminal has moved to a different cell in the same NG-RAN.

Also, the example in FIG. 11 assumes that the Old NG-RAN still has the UE context during the SDT procedure, but this is for illustrative purposes only. The example of FIG. 11 can also be applied to the case where the Old NG-RAN has already forwarded the UE context to NG-RAN #1. The example in FIG. 11 also assumes that NG-RAN #1, NG-RAN #2, and the old NG-RAN are not separated into CU-CP, CU-UP, and DU, but this is for illustrative purposes only. The example in FIG. 11 may also apply when NG-RAN #1, NG-RAN #2, and/or old NG-RAN are separated into CU-CP, CU-UP, and DU.

Step 0: This can be performed in the same way as step 0 in FIG. 9.

Step 1: The terminal is in RRC-INACTIVE state and performing SDT with the New NG-RAN (e.g., NG-RAN #1). In other words, in the procedure of Step 1, the old NG-RAN has forwarded the UE context to the new NG-RAN. Therefore, the serving NG-RAN for the terminal may be the new NG-RAN. The new NG-RAN may only resume SDT bearer to support SDT for the terminal. Since NG-RAN #1 has not yet sent UE CONTEXT RELEASE message to Old NG-RAN, UE context may exist on both NG-RAN #1 and Old NG-RAN.

NOTE: When Step 1 is performed, it is possible that the old NG-RAN is only passing information related to RLC, MAC and PHY layers to NG-RAN #1 for SDT transmission, while the UE context itself is being stored by the old NG-RAN.

Step 2: During the SDT procedure, the terminal may be served by a cell in NG-RAN #1, and then perform cell re-selection to a cell in NG-RAN #2.

NOTE: The example in FIG. 11 can also be applied when the terminal performs cell reselection from Cell #1 to Cell #2 within NG-RAN #1.

Step 3: The terminal may send an RRC Resume Request message from the new cell in NG-RAN #2 to resume the SDT procedure already in progress. That is, since the terminal has performed cell reselection to the new cell in NG-RAN #2, the terminal may send an RRC Resume Request message to the new cell in NG-RAN #2. In this process, the terminal may also forward UL data.

Step 4: NG-RAN #2 checks if it has a UE context for the terminal based on the I-RNTI contained in the RRC Resume Request message. If it fails to find the UE context, it requests the UE context by sending a RETRIEVE UE CONTEXT REQUEST message to the Old NG-RAN (=Last Serving NG-RAN) that has the UE context based on the I-RNTI.

Step 5: Upon receiving the RETRIEVE UE CONTEXT REQUEST message from NG-RAN #2, the Old NG-RAN may verify that it has the UE context for the terminal. The Old NG-RAN may perform a validation of the terminal. If it has the corresponding UE context and the validation of the terminal is complete, the Old NG-RAN can decide whether to forward the UE context to NG-RAN #2. During this process, the Old NG-RAN may realize that the SDT process with NG-RAN #1 is ongoing for that terminal and that the SDT process with NG-RAN #1 should be terminated.

Step 6: The old NG-RAN may deliver the UE context for the terminal to NG-RAN #2 via a RETRIEVE UE CONTEXT RESPONSE message.

NOTE: It is also possible for the Old NG-RAN to forward only information related to the RLC, MAC, and PHY layers to enable SDT transmission over NG-RAN #2 while maintaining the UE context.

Step 7: The Old NG-RAN may send a RETRIEVE UE CONTEXT CANCEL message to NG-RAN #1 to inform NG-RAN #1 that the SDT currently in progress should be stopped because the terminal has moved to a cell in another NG-RAN. In this process, the Old NG-RAN may forward the TEID information of the tunnel for data forwarding to transfer "DL data to be sent to the terminal or UL data received from the terminal" to the Old NG-RAN, which already exists within NG-RAN #1, to NG-RAN #1.

If NG-RAN #1 receives the data forwarding address from the old NG-RAN, NG-RAN #1 may use the tunnel information to forward all remaining UL/DL data to the old NG-RAN. The old NG-RAN may forward the data received from NG-RAN #1 to NG-RAN #2 or 5GC.

NOTE: The UE CONTEXT RELEASE message may be used instead of the RETRIEVE UE CONTEXT CANCEL message.

NOTE: If the terminal has moved to another cell within NG-RAN #1, the operations performed in Steps 4 to 7 may still be applied. Alternatively, NG-RAN #1 may know from Step 3 that the terminal has moved from cell #1, where the SDT is currently in progress, to another cell #2 in NG-RAN #1, and therefore may release all information about the terminal assigned to cell #1 without performing Step 7, as in the example of FIG. 9 or the examples of FIGS. 10a and 10b.

Step 8: The terminal can continue the SDT procedure through the cells in NG-RAN #2. By performing the operations in Steps 4 to 6, NG-RAN #2 may become the new serving NG-RAN and exchange data with the terminal. Alternatively, if the old NG-RAN still acts as the serving NG-RAN, a data path to the old NG-RAN may be established through NG-RAN #2.

4. A Fourth Example of the Disclosure of the Present Specification

Hereinafter, a fourth example of the disclosure will be described with reference to the example of FIG. 12.

A fourth example of the disclosure of the present specification includes an example of a procedure that triggers an RRC Resume procedure, in the same cell. For example, the fourth example of the disclosure of the present specification illustrates an example of a procedure to support triggering an RRC Resume procedure. The operations described in the fourth example of the disclosure of the present specification may be performed after the CG-SDT resource configuration is completed.

The following drawings are intended to illustrate specific embodiments of the present disclosure. The designations of specific devices or the designations of specific signals/ messages/fields shown in the drawings are for illustrative purposes only, and the technical features of this specification are not limited to the specific designations used in the drawings below.

FIG. 12 illustrates a signal flow diagram according to the fourth example of the disclosure of the present specification.

The example in FIG. 12 shows an example to support a procedure to trigger the RRC Resume procedure after the CG-SDT resource configuration is complete.

The example in FIG. 12 includes an example of how to attempt a normal resume procedure when the terminal has data to be transmitted via a non-SDT bearer in a cell that has been configured with a CG-SDT resource.

Step 0: When the terminal is in RRC_CONNECTED state, the terminal may stay in RRC_INACTIVE state after receiving CG-SDT resource configuration from the gNB-DU via gNB-CU-CP.

If the terminal has data that needs to be sent to the network over a non-SDT bearer, the device may decide to attempt the normal resume procedure.

Step 1: The terminal can send an RRC Resume Request message to the gNB-DU, while the terminal is in RRC_I-NACTIVE state.

Step 2: The gNB-DU may forward the RRC Resume Request message received from the terminal to the gNB-CU-CP by including it in the F1AP INITIAL UL RRC MESSAGE TRANSFER message.

Step 3: Based on the I-RNTI information included in the RRC Resume Request message, the gNB-CU (e.g., gNB-CU-CP) may know that the terminal has executed the Resume process again to transition to the RRC-CONNECTED state during the SDT transmission. Here, the I-RNTI information may be an ID to distinguish the UE context for the terminal in the RRC_INACTIVE state. The gNB-CU (e.g., gNB-CU-CP) validates the I-RNTI information and, based on this, successfully locates the UE context for the terminal stored by the gNB-CU, indicating that the SDT for the terminal has been initiated. The gNB-CU (e.g., gNB-CU-CP) may already know that the gNB-DU has created the CG-SDT resource allocation and UE context for the terminal in Step 0a.

Step 4: The gNB-CU (e.g., gNB-CU-CP) may request the setup for the non-SDT bearer (e.g., Bearer configuration, F1 UL TEIDs) by sending a UE CONTEXT SETUP REQUEST message to the gNB-DU. At this time, the gNB-CU (e.g., gNB-CU-CP) may forward the old gNB-DU UE F1AP ID set by the gNB-DU during the CG-SDT allocation process for that terminal (e.g., Step 0a) to the gNB-DU with the UE CONTEXT SETUP REQUEST message. The gNB-DU can then recognize that the terminal is attempting to set up a non-SDT bearer in addition to the SDT bearer. This allows the gNB-DU to utilize the SDT bearer, CG configuration, etc. that it has set up for the terminal.

For example, the gNB-CU (e.g., gNB-CU-CP) may send a request message related to a UE CONTEXT that includes information about an old SDT session (e.g., old gNB-DU UE F1AP ID) to the gNB-DU. The gNB-DU can then recognize that the terminal is attempting to establish a non-SDT bearer in addition to the SDT bearer. The gNB-DU can still utilize the SDT bearer, CG configuration (e.g., SDT resource configuration), etc. that it has set up for the terminal. For example, the gNB-DU may receive a request message related to the UE CONTEXT containing information about an old SDT session (e.g., old gNB-DU UE F1AP ID) from the gNB-CU (e.g., gNB-CU-CP). If the request message related to the UE CONTEXT includes information about the old SDT session (e.g., old gNB-DU UE F1AP ID), the gNB-DU may retrieve the old SDT resource configuration and the old UE context based on the information about the old SDT session (e.g., old gNB-DU UE F1AP ID). Accordingly, the gNB-DU may use the old SDT resource configuration and old UE context for non-SDT bearers.

Step 5: The gNB-DU completes the bearer setup for the terminal according to the message received from the gNB-CU-CP in Step 4, and may respond by sending the UE CONTEXT SETUP RESPONSE message.

Step 6: The gNB-CU-CP may generate an RRC Resume message to inform the terminal of the transition to the RRC_CONNECTED state. The gNB-CU-CP may forward the RRC Resume message to the gNB-DU via DL RRC MESSAGE TRANSFER.

Step 7: The gNB-DU can forward the RRC Resume message received in Step 6 to the terminal. Based on the RRC Resume message, the terminal can resume all bearers and transition to RRC_CONNECTED state. The terminal may transmit UL data existing on the non-SDT bearer to the NG-RAN.

Step 8: The terminal may respond by sending an RRC Resume Complete message to the NG-RAN.

Step 9: The gNB-DU may forward the RRC message sent by the terminal to the gNB-CU-CP via UL RRC MESSAGE TRANSFER.

NOTE: Steps 6 and 10 can be performed simultaneously. Step 10 can also be performed before Step 6.

Step 10: The gNB-CU-CP may send a BEARER CONTEXT MODIFICATION REQUEST message to the gNB-CU-UP to indicate that the terminal will attempt to transmit data over a non-SDT bearer and transition to the RRC_CONNECTED state accordingly.

In this process, the gNB-CU-CP may forward DL TEIDs information for non-SDT bearers received from the gNB-DU together.

Step 11: The gNB-CU-UP updates the Bearer Context according to the gNB-CU-CP request received in Step 8 and may respond by sending a BEARER CONTEXT MODIFICATION RESPONSE message.

5. The Fifth Example of the Disclosure of the Present Specification

Hereinafter, a fifth example of the disclosure of the present specification will be described with reference to the example of FIG. 13 and the example of FIG. 14.

The fifth example of the disclosure of the present specification may represent an example of operation of a gNB (e.g., including a gNB-DU and a gNB-CU) that may be applicable to at least one of the first, second, third, and/or fourth examples of the disclosure previously described through various examples.

Hereinafter, the operation of the gNB-DU and the operation of the gNB-CU described in the example of FIG. 13 and the example of FIG. 14 are illustrative only, and in the scope of the disclosure of the present specification, the operation of the gNB-DU and the operation of the gNB-CU are not limited by the example of FIG. 13 and the example of FIG. 14. For example, the gNB-DU and/or the gNB-CU may perform the operations described in the first example, second example, third example, and/or fourth example of the disclosure of the present specification, even if not shown in the example of FIG. 13 and the example of FIG. 14.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

FIG. 13 is a signal flow diagram according to the first example of the fifth example of the disclosure of the present specification.

The example in FIG. 13 illustrates an example where a gNB-DU and a gNB-CU perform communications related to the UE context.

In step S1201, the gNB-CU may transmit a request message to the gNB-DU. For example, the gNB-CU may transmit a request message related to a UE context to the gNB-DU.

The request message may include information related to the old F1AP UE ID. The old F1AP UE ID may enable the gNB-DU to retrieve the old resource configuration and the previous UE context to set up the UE context.

Before performing step S1201, an RRC resume request message may be received from the UE. The RRC resume request message may include information related to the bearer for the SDT session. The gNB-CU may determine, based on the receipt of the RRC resume request message, that the UE wishes to transmit data via a bearer for a non-SDT session. Based on that the RRC resume request message is received, the old F1AP UE ID information may be included in the request message.

In step S1202, the gNB-DU may transmit a response message to the gNB-CU. The response message may include information that the gNB-DU has completed the setup of the UE context.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

FIG. 14 illustrates a signal flow diagram according to the second example of the fifth example of the disclosure of the present specification.

In the example of FIG. 14, a gNB-DU and a gNB-CU are shown. In the example of FIG. 14, the gNB may be separated into a gNB-DU and a gNB-CU. For example, the gNB may be physically or logically separated into a gNB-DU and a gNB-CU.

The example in FIG. 14 may represent an example of a UE Context Setup procedure.

The UE Context Setup procedure may be performed to set up the UE Context in the gNB-DU. For example, the UE Context may include signaling radio bearer (SRB), data radio bearer (DRB), BH RLC channel and/or SL DRB Configuration. The UE Context Setup procedure may use signaling related to UE.

According to the example of FIG. 14, the gNB-CU may initiate the procedure by sending a UE CONTEXT SETUP REQUEST message to the gNB-DU. After receiving the UE CONTEXT SETUP REQUEST message, the gNB-DU may establish the UE context. The gNB-CU may also send a UE CONTEXT SETUP REQUEST message including an Old CG-SDT Session Info Information Element (IE) to the gNB-DU.

If the gNB-DU is successful in establishing the UE context, the gNB-DU may respond to the gNB-CU by sending a UE CONTEXT SETUP RESPONSE message to the gNB-CU. If no UE-associated logical F1-connection exists, a UE-associated logical F1-connection may be established as part of the UE Context Setup procedure.

If an old CG-SDT Session Info IE (e.g., including a gNB-DU F1AP UE ID) is included in the UE CONTEXT SETUP REQUEST message, the gNB-DU may retrieve the old CG-SDT resource configuration and the old UE context based on the indicated gNB-DU F1AP UE ID. For example, as described in the first, second, third, and/or fourth examples of this disclosure, the gNB-DU may utilize information such as the SDT bearer, CG configuration (e.g., SDT resource configuration), etc. that it has established for the UE. For example, the gNB-DU may use an old CG-SDT resource configuration and an old UE context to set up a non-SDT bearer for a UE using SDT.

As described in the disclosure of the present specification with reference to various examples, various operations performed during SDT may be supported. For example, while the terminal is performing an SDT, it may be supported that the SDT is attempted again after CP signaling (or NAS PDU transmission), transitioning to the RRC-CONNECTED state, and/or cell-reselection to another cell. This prevents the terminal from unnecessarily transitioning to RRC-IDLE and then re-establishing an RRC connection or forcing a transition to RRC-CONNECTED.

The various examples of the disclosure, described with reference to the various drawings, may be practiced individually or in combination with other examples.

As described in the disclosure of the present specification with reference to various examples, the network may transition the terminal, which is performing small data transmission, from the RRC-INACTIVE state to the RRC-CONNECTED state. For example, the terminal may once again forward an RRC Resume Request message to the wireless network. By forwarding information about the old SDT session (e.g., old gNB-DU UE F1AP ID) that the DU previously assigned to the terminal in the SDT procedure to the DU, the CU-CP of the wireless network may inform the DU that the terminal is transitioning from SDT in RRC-INACTIVE state to RRC-CONNECTED state. The DU in the wireless network may create a new bearer for the terminal, in addition to the previously assigned UE context, and notify the CU-CP of it. The CU-CP may command the terminal to transition to the RRC-CONNECTED state by sending an RRC Resume message to the terminal.

As described in the disclosure of the present specification herein with reference to various examples, in a situation where SDT is established, communication can be performed efficiently when a terminal has data for a non-SDT bearer. For example, when a terminal transitions from RRC_Inactive to RRC_CONNECTED state to transmit non-SDT related data, the gNB-DU may efficiently allocate resources and UE context for one terminal. For example, by the gNB-CU sending information about the old F1AP UE ID to the gNB-DU, the gNB-DU may retrieve the old resource settings and the old UE context that were set up for the SDT. By establishing the UE context based on the previous resource configuration and the previous UE context, the gNB-DU may efficiently allocate resources and UE context for a single terminal.

For reference, the operation of the terminal (e.g., UE) described in this specification may be implemented by the apparatus of FIGS. 1 to 3 described above. For example, the terminal (e.g., UE) may be the first device 100 or the second device 200 of FIG. 2. For example, an operation of a terminal (e.g., UE) described herein may be processed by one or more processors 102 or 202. The operation of the terminal described herein may be stored in one or more memories 104 or 204 in the form of an instruction/program (e.g., instruction, executable code) executable by one or more processors 102 or 202. One or more processors 102 or 202 control one or more memories 104 or 204 and one or more transceivers 105 or 206, and may perform the operation of the terminal (e.g., UE) described herein by executing instructions/programs stored in one or more memories 104 or 204.

In addition, instructions for performing an operation of a terminal (e.g., UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (e.g., UE) described in the disclosure of the present specification.

For reference, the operation of a network node (e.g., AMF, SMF, UPF, PCF, UDM, DN etc.) or base station (e.g., NG-RAN, gNB, eNB, RAN, E-UTRAN, new NG-RAN, DU, CU, CU-UP, CU-CP, gNB-DU, gNB-CU etc.) described herein may be implemented by the apparatus of FIGS. 1 to 3 to be described below. For example, a network node or a base station may be the first device 100 of FIG. 2 or the second device 200 of FIG. 2. For example, the operation of a network node or base station described herein may be processed by one or more processors 102 or 202. The operation of the terminal described herein may be stored in one or more memories 104 or 204 in the form of an instruction/program (e.g., instruction, executable code) executable by one or more processors 102 or 202. One or more processors 102 or 202 may perform the operation of a network node or a base station described herein, by controlling one or more memories 104 or 204 and one or more transceivers 106 or 206 and executing instructions/programs stored in one or more memories 104 or 204.

In addition, instructions for performing the operation of the network node or base station described in the disclosure of the present specification may be stored in a non-volatile (or non-transitory) computer-readable storage medium. The storage medium may be included in one or more memories 104 or 204. And, the instructions recorded in the storage medium are executed by one or more processors 102 or 202, so that the operations of a network node or base station are performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method comprising:
receiving, by a gNB-Centralized Unit (gNB-CU), an INITIAL UL RRC MESSAGE TRANSFER message from a gNB-Distributed Unit (gNB-DU), wherein the INITIAL UL RRC MESSAGE TRANSFER message includes a Radio Resource Control (RRC) resume request message transmitted from a User Equipment (UE), wherein the RRC resume request message is based on the UE deciding to transit to an RRC connected state for a non-Small Data Transmission (SDT) bearer transmission, and wherein the RRC resume request message includes an Inactive Radio Network Temporary Identifier (I-RNTI);

based on a first UE context being retrieved based on the I-RNTI, transmitting, by the gNB-CU, a UE context request message to the gNB-DU, wherein, based on receiving the RRC resume request message via the gNB-DU, the UE context request message includes a gNB-DU UE F1 Application Protocol (F1AP); and receiving, by the gNB-CU, a UE context response message from the gNB-DU, wherein a Configured Grant (CG)-SDT configuration and a second UE context are retrieved based on the gNB-DU UE F1AP ID.

2. The method of claim 1, wherein the UE context response message includes information related to a completed setup of a third UE context by the gNB-DU.

3. A gNB-Centralized Unit (gNB-CU) comprising:
at least one processor; and
at least one memory, storing instructions and operably electrically coupled to the at least one processor,
wherein, based on the instructions being executed by the at least one processor, operations performed by the at least one processor comprise:
receiving an INITIAL UL RRC MESSAGE TRANSFER message from a gNB-Distributed Unit (gNB-DU), wherein the INITIAL UL RRC MESSAGE TRANSFER message includes a Radio Resource Control (RRC) resume request message transmitted from a User Equipment (UE), wherein the RRC resume request message is based on the UE deciding to transit to an RRC connected state for a non-Small Data Transmission (SDT) bearer transmission, and wherein the RRC resume request message includes an Inactive Radio Network Temporary Identifier (I-RNTI);

based on a first UE context being retrieved based on the I-RNTI, transmitting a UE context request message to the gNB-DU, wherein the UE context request message includes a gNB-DU UE F1 Application Protocol (F1AP) ID based on receiving the RRC resume request message via the gNB-DU; and receiving a UE context response message from the gNB-DU, wherein a Configured Grant (CG)-SDT configuration and a second UE context are retrieved based on the gNB-DU UE F1AP ID.

4. The gNB-CU of claim 3, wherein the UE context response message includes information related to a completed setup of a third UE context by the gNB-DU.

5. A method comprising:
receiving, by a gNB-Distributed Unit (DU), a Radio Resource Control (RRC) resume request message from a User Equipment (UE) based on the UE deciding to transit to an RRC connected state for a non-Small Data Transmission (SDT) bearer transmission, wherein the RRC resume request message includes an Inactive Radio Network Temporary Identifier (I-RNTI);

transmitting, by the gNB-DU, an INITIAL UL RRC MESSAGE TRANSFER message to a gNB-Centralized Unit, gNB-CU, wherein the INITIAL UL RRC MESSAGE TRANSFER message includes the RRC resume request message;

based on a first UE context being retrieved based on the I-RNTI, receiving, by the gNB-DU, a UE context request message from the gNB-CU, wherein the UE context request message includes a gNB-DU UE F1 Application Protocol (F1AP) ID;

retrieving, by the gNB-DU, a Configured Grant (CG)-SDT configuration and a second UE context based on the gNB-DU UE F1AP ID; and transmitting, by the gNB-DU, a UE context response message to the gNB-CU.

6. The method of claim 5, wherein the UE context response message includes information related to a completed setup of a third UE context by the gNB-DU.

\* \* \* \* \*